US011900683B2

(12) United States Patent
Chatoo et al.

(10) Patent No.: US 11,900,683 B2
(45) Date of Patent: *Feb. 13, 2024

(54) SETTING AD BREAKPOINTS IN A VIDEO WITHIN A MESSAGING SYSTEM

(71) Applicant: Snap Inc., Santa Monica, CA (US)

(72) Inventors: Khalil Chatoo, Santa Monica, CA (US); David Michael Hornsby, Surrey (GB); Jeffrey Kile, Los Alamitos, CA (US); Chinmay Lonkar, Playa Vista, CA (US); Zhimin Wang, Culver City, CA (US); Ian Anthony Wehrman, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,112

(22) Filed: Feb. 21, 2023

(65) Prior Publication Data

US 2023/0196776 A1 Jun. 22, 2023

Related U.S. Application Data

(63) Continuation of application No. 17/222,451, filed on Apr. 5, 2021, now Pat. No. 11,694,444.

(Continued)

(51) Int. Cl.
*G06V 20/40* (2022.01)
*G06T 7/90* (2017.01)
(Continued)

(52) U.S. Cl.
CPC ............ *G06V 20/49* (2022.01); *G06F 18/285* (2023.01); *G06T 7/90* (2017.01); *G06V 20/46* (2022.01);
(Continued)

(58) Field of Classification Search
CPC ...... G06V 20/49; G06V 20/46; G06V 40/161; G06V 40/172; G06F 18/285; G06T 7/90;
(Continued)

(56) References Cited

U.S. PATENT DOCUMENTS

| 4,390,904 A | 6/1983 | Johnston et al. |
| 11,694,444 B2 | 7/2023 | Chatoo et al. |

(Continued)

FOREIGN PATENT DOCUMENTS

| CN | 111370022 A | 7/2020 |
| CN | 116235505 A | 6/2023 |

(Continued)

OTHER PUBLICATIONS

"U.S. Appl. No. 17/222,451, Non Final Office Action dated Feb. 3, 2022", 12 pgs.

(Continued)

*Primary Examiner* — Girumsew Wendmagegn
(74) *Attorney, Agent, or Firm* — Schwegman Lundberg & Woessner, P.A.

(57) ABSTRACT

Aspects of the present disclosure involve a system comprising a computer-readable storage medium storing a program and method for setting ad breakpoints in a video. The program and method provide for accessing a video; determining plural shot boundaries for the video, each shot boundary defining a shot corresponding to a contiguous sequence of video frames that is free of cuts or transitions; and for each shot boundary of the plural shot boundaries, performing a set of breakpoint tests on the shot boundary, each breakpoint test configured to return a respective score indicating whether the shot boundary corresponds to a breakpoint for potential insertion of an ad during playback of the video, calculating a combined score for the shot boundary based on combining the each of the respective (Continued)

scores, and setting, in a case where the combined score meets a threshold value, the shot boundary as the breakpoint.

20 Claims, 13 Drawing Sheets

Related U.S. Application Data

(60) Provisional application No. 63/085,446, filed on Sep. 30, 2020.

(51) Int. Cl.
  *G11B 27/10* (2006.01)
  *G11B 27/06* (2006.01)
  *G11B 27/036* (2006.01)
  *G10L 25/78* (2013.01)
  *G06V 40/16* (2022.01)
  *G06F 18/20* (2023.01)

(52) U.S. Cl.
  CPC .......... *G06V 40/161* (2022.01); *G06V 40/172* (2022.01); *G10L 25/78* (2013.01); *G11B 27/036* (2013.01); *G11B 27/06* (2013.01); *G11B 27/10* (2013.01); *G06T 2207/10016* (2013.01)

(58) Field of Classification Search
  CPC ........... G06T 2207/10016; G10L 25/78; G11B 27/036; G11B 27/06; G11B 27/10
  See application file for complete search history.

(56) References Cited

U.S. PATENT DOCUMENTS

| | | |
|---|---|---|
| 2001/0003468 A1 | 6/2001 | Hampapur et al. |
| 2004/0158858 A1 | 8/2004 | Paxton et al. |
| 2006/0136206 A1 | 6/2006 | Ariu et al. |
| 2007/0157228 A1 | 7/2007 | Bayer et al. |
| 2007/0201558 A1 | 8/2007 | Xu et al. |
| 2008/0114861 A1 | 5/2008 | Gildred |
| 2008/0262912 A1 | 10/2008 | Gargi |
| 2009/0083186 A1 | 3/2009 | Dharmaji et al. |
| 2009/0222853 A1 | 9/2009 | White et al. |
| 2010/0259688 A1 | 10/2010 | Zoetekouw et al. |
| 2012/0095817 A1 | 4/2012 | Kamil et al. |
| 2012/0124618 A1 | 5/2012 | Ruiz-Velasco et al. |
| 2014/0126887 A1 | 5/2014 | Harville |
| 2014/0150019 A1 | 5/2014 | Ma et al. |
| 2015/0324841 A1 | 11/2015 | Pettit |
| 2016/0156945 A1 | 6/2016 | Romrell et al. |
| 2016/0353141 A1 | 12/2016 | Miller et al. |
| 2017/0134805 A1 | 5/2017 | Canney |
| 2017/0195744 A1 | 7/2017 | Engel et al. |
| 2018/0150469 A1 | 5/2018 | Wang et al. |
| 2018/0315076 A1 | 11/2018 | Andreou |
| 2019/0034528 A1 | 1/2019 | Lintz |
| 2020/0045378 A1 | 2/2020 | Neumeier et al. |
| 2020/0175548 A1 | 6/2020 | Li et al. |
| 2020/0195983 A1 | 6/2020 | Chao |
| 2021/0058654 A1 | 2/2021 | Estus et al. |
| 2022/0020376 A1 | 1/2022 | Garg et al. |
| 2022/0101013 A1 | 3/2022 | Chatoo et al. |
| 2022/0103894 A1 | 3/2022 | Blackwood et al. |
| 2022/0103912 A1 | 3/2022 | Hornsby et al. |

FOREIGN PATENT DOCUMENTS

| | | | |
|---|---|---|---|
| CN | 116324990 A | | 6/2023 |
| CN | 116325765 A | | 6/2023 |
| EP | 1040656 A2 | | 10/2000 |
| WO | WO-2009036392 A2 | | 3/2009 |
| WO | WO-2009039046 A2 | | 3/2009 |
| WO | WO-2022072542 A1 | | 4/2022 |
| WO | WO-2022072664 A1 | | 4/2022 |
| WO | WO-2022072708 A1 | | 4/2022 |

OTHER PUBLICATIONS

"U.S. Appl. No. 17/222,451, Notice of Allowance dated Feb. 13, 2023", 5 pgs.
"U.S. Appl. No. 17/222,451, Notice of Allowance dated Aug. 18, 2022", 9 pgs.
"U.S. Appl. No. 17/222,451, Response filed May 3, 22 to Non Final Office Action dated Feb. 3, 2022", 10 pgs.
"U.S. Appl. No. 17/222,477, Final Office Action dated Nov. 4, 2022", 10 pgs.
"U.S. Appl. No. 17/222,477, Non Final Office Action dated Feb. 1, 2023", 10 pgs.
"U.S. Appl. No. 17/222,477, Non Final Office Action dated May 9, 2022", 9 pgs.
"U.S. Appl. No. 17/222,477, Response filed Jan. 4, 2023 to Final Office Action dated Nov. 4, 2022", 8 pgs.
"U.S. Appl. No. 17/222,477, Response filed Aug. 9, 22 to Non Final Office Action dated May 9, 2022", 8 pgs.
"U.S. Appl. No. 17/222,535, Non Final Office Action dated Aug. 26, 2022", 10 pgs.
"U.S. Appl. No. 17/222,535, Response filed Nov. 23, 2022 to Non Final Office Action dated Aug. 26, 2022", 8 pgs.
"International Application Serial No. PCT/US2021/052714, International Search Report dated Feb. 4, 2022", 4 pgs.
"International Application Serial No. PCT/US2021/052714, Written Opinion dated Feb. 4, 2022", 8 pgs.
"International Application Serial No. PCT/US2021/052922, International Search Report dated Jan. 14, 2022", 5 pgs.
"International Application Serial No. PCT/US2021/052922, Written Opinion dated Jan. 14, 2022", 6 pgs.
"International Application Serial No. PCT/US2021/052986 , Written Opinion dated Dec. 21, 2021", 5 pgs.
"International Application Serial No. PCT/US2021/052986, International Search Report dated Dec. 21, 2021", 5 pgs.
Berrani, S A, et al., "A non-supervised approach for repeated sequence detection in TV broadcast streams", Signal Processing. Image Communication, Elsevier Science Publishers, Amsterdam, NL, vol. 23, No. 7, (Aug. 1, 2008), 525-537.
"U.S. Appl. No. 17/222,451, Corrected Notice of Allowability dated May 24, 2023", 2 pgs.
"U.S. Appl. No. 17/222,477, Notice of Allowance dated May 25, 2023", 9 pgs.
"U.S. Appl. No. 17/222,477, Response filed May 1, 2023 to Non Final Office Action dated Feb. 1, 2023", 9 pgs.
"U.S. Appl. No. 17/222,535, Final Office Action dated Feb. 22, 2023", 11 pgs.
"U.S. Appl. No. 17/222,535, Notice of Allowance dated Aug. 9, 2023", 9 pgs.
"U.S. Appl. No. 17/222,535, Response filed May 19, 2023 to Final Office Action dated Feb. 22, 2023", 8 pgs.
"International Application Serial No. PCT/US2021/052714, International Preliminary Report on Patentability dated Apr. 13, 2023", 10 pgs.
"International Application Serial No. PCT/US2021/052922, International Preliminary Report on Patentability dated Apr. 13, 2023", 8 pgs.
"International Application Serial No. PCT/US2021/052986, International Preliminary Report on Patentability dated Apr. 13, 2023", 7 pgs.

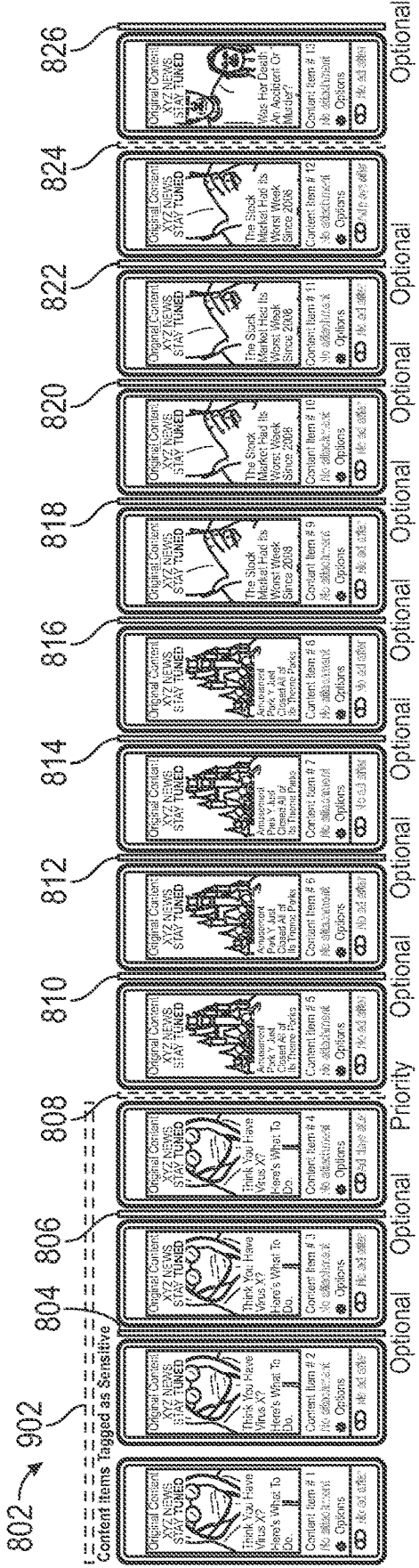
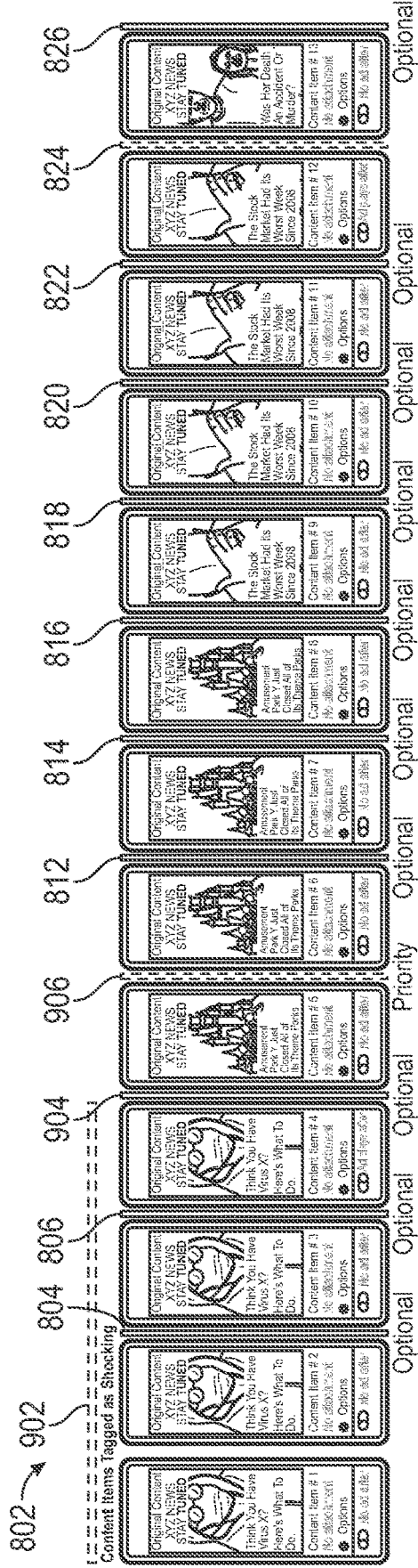
FIG. 9A
FIG. 9B

SETTING AD BREAKPOINTS IN A VIDEO WITHIN A MESSAGING SYSTEM

CROSS-REFERENCE TO RELATED APPLICATION

This patent application is a continuation of U.S. patent application Ser. No. 17/222,451, filed Apr. 5, 2021, which patent application claims the benefit of U.S. Provisional Patent Application No. 63/085,446, filed Sep. 30, 2020, entitled "SETTING AD BREAKPOINTS IN A VIDEO WITHIN A MESSAGING SYSTEM", which is incorporated by reference herein in its entirety.

TECHNICAL FIELD

The present disclosure relates generally to a messaging system, including inserting ads into a video within a messaging system.

BACKGROUND

Messaging systems provide for the exchange of message content between users. A messaging system may allow a user to view a video provided by another user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 9A illustrates an example of setting media content items as sensitive, in accordance with some example embodiments.

FIG. 9B illustrates an example of adjusting breakpoints for a video having media content items set to sensitive, in accordance with some example embodiments.

DETAILED DESCRIPTION

A messaging system typically allows users to exchange content items (e.g., messages, images and/or video) with one another in a message thread. A messaging system may provide for inserting ads into a video during playback of the video.

The disclosed embodiments provide for a publisher to create a video for sharing with one or more viewing users (e.g., subscribers). The video is analyzed to determine multiple shot boundaries, and some of the shot boundaries may be selected as breakpoints for potential insertion of ads during playback of the video. The breakpoints may be selected based on a set of breakpoint tests (e.g., video fade-out, audio fade-out, transcript gaps, color differences, audio frequency differences, background audio characteristics, on-screen text, facial scans test, and/or machine learning). The publisher may also select to prioritize breakpoints for potential ad insertion.

When a breakpoint is reached during playback of the video on a client device, an ad may be selected and served to the client device. For example, server-side logic may provide for filtering ads with certain types of sensitive content based on similar or related types of sensitive content within the video. The client device receives an ad selected by the server based on the filtering, and determines whether to insert the ad at the breakpoint based on client-side rules. The client-side rules may prioritize inserting ads at prioritized breakpoints. In addition, the client-side rules may include timing requirements, such as a minimum amount of playback time and/or a minimum number of media content items that have played since the last ad (e.g., or since starting playback). Moreover, the client-side rules may provide further filtering of ads, to disallow or otherwise reduce the likelihood of inserting an ad with certain type(s) of content in between video content that is similar or otherwise related.

Figure 1:
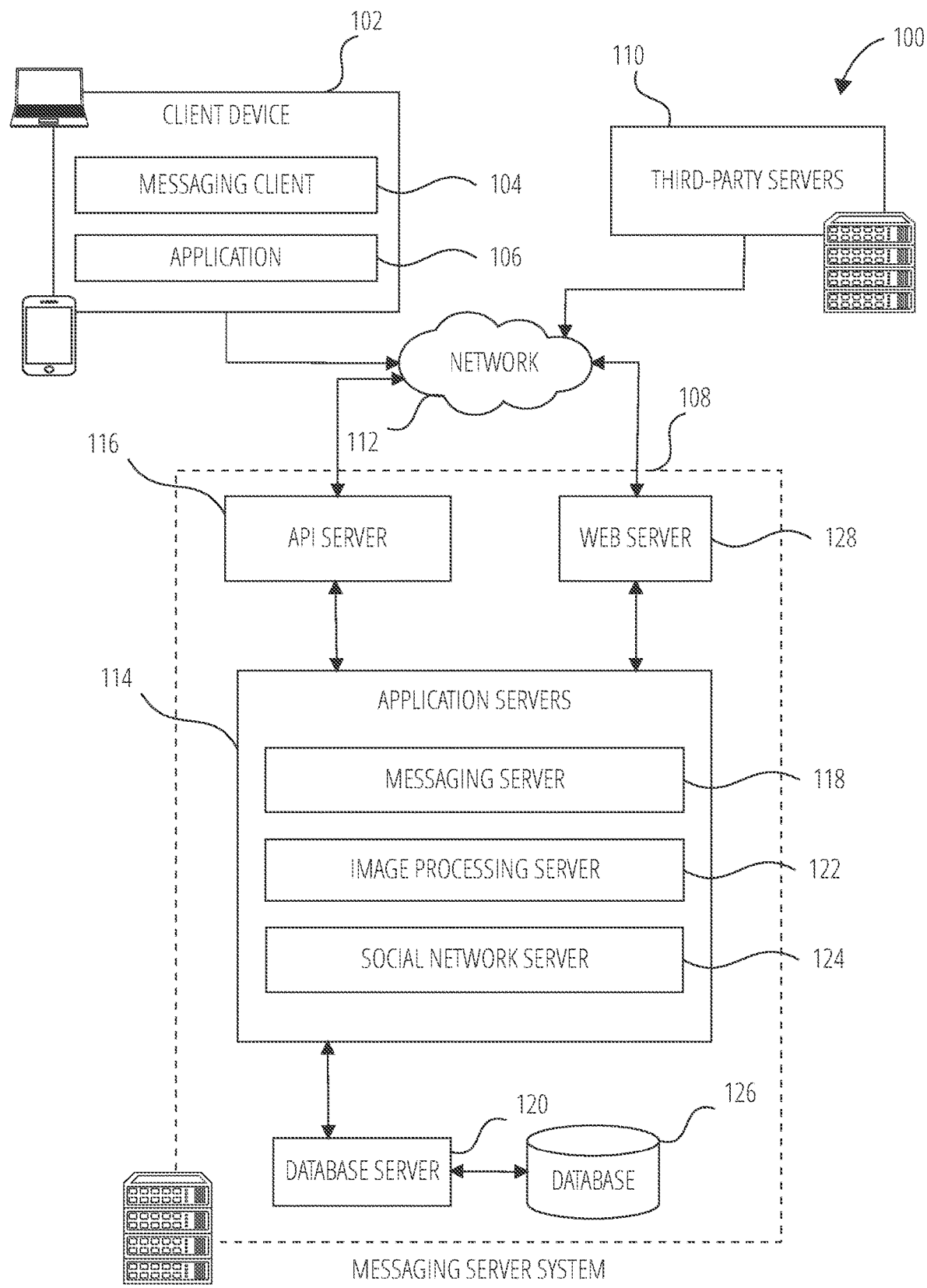
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
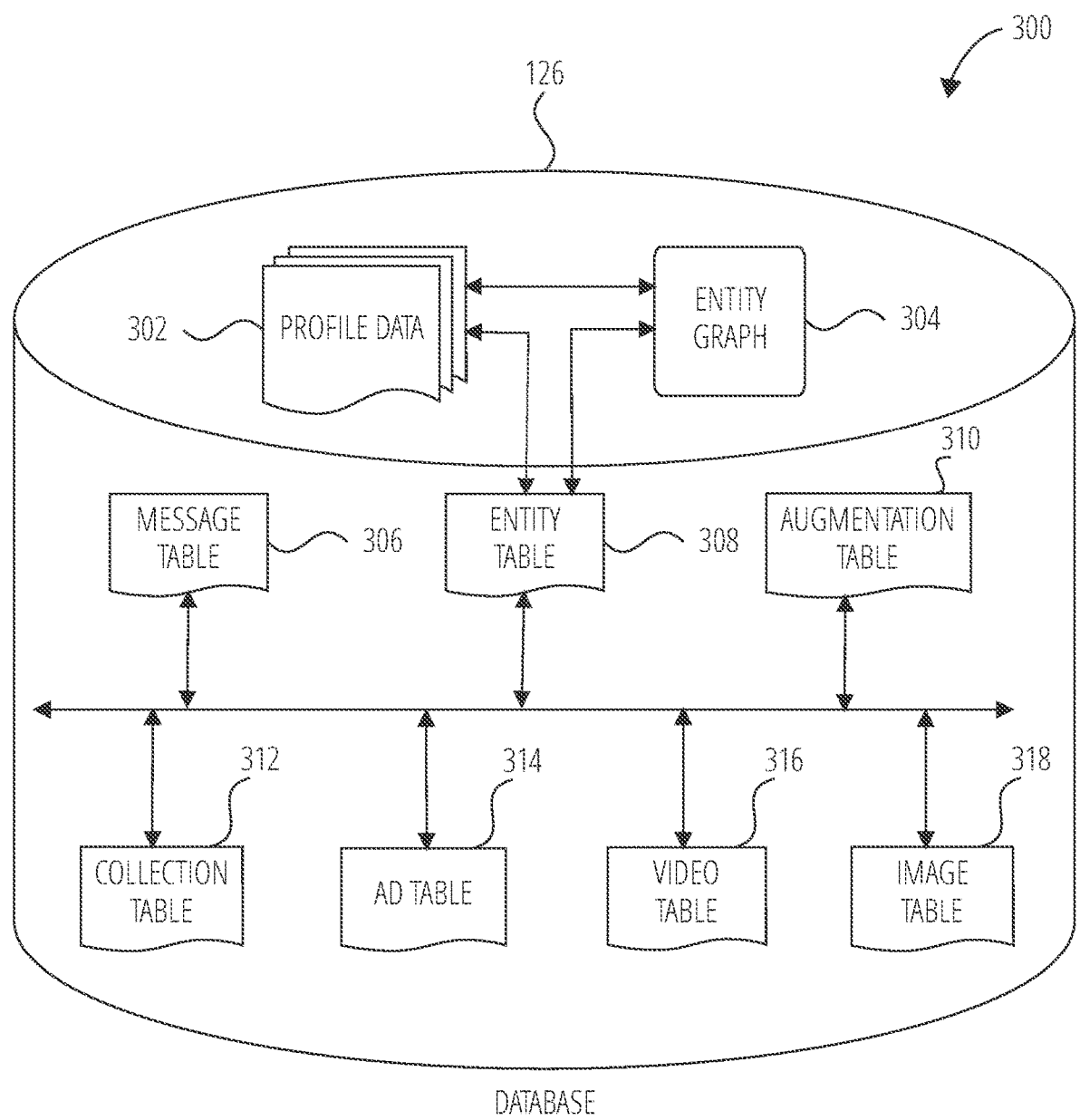
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
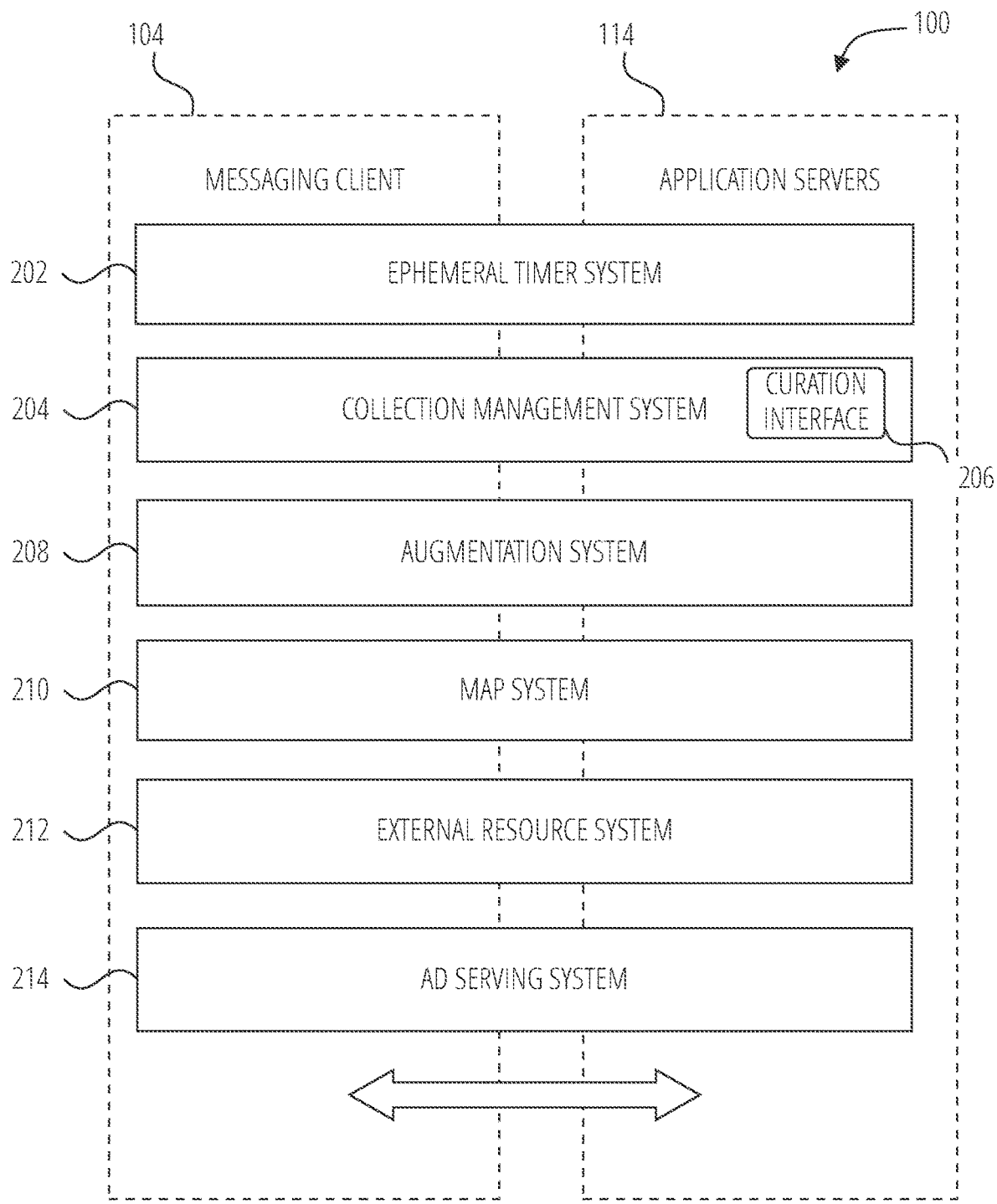
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, an external resource system 212, and an ad serving system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video. To facilitate the presentation of augmented reality content, the augmentation system 208 may implement or otherwise access object recognition algorithms (e.g., including machine learning algorithms) configured to scan an image or video, and to detect/track the movement of objects within the image or video.

The map system 210 provides various geographic location functions, and supports the presentation of map-based media content and messages by the messaging client 104. For example, the map system 210 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The ad serving system 214 provides various ad serving and management related functions within the context of the messaging system 100. In one or more embodiments, the ad serving system 214 stores advertising content (e.g., ads) used in online marketing, and delivers the ads to the messaging client 104. Thus, the ad serving system 214 is configured to store the ads, and to distribute the ads for potential insertion into available ad slots. For example, the ad serving system 214 may serve video ads for inserting into breakpoints (e.g., ad slots) of a video playing on the messaging client 104. Moreover, the ad serving system 214 implements or otherwise accesses algorithm(s) to select which ads are served, count ads that are served, and/or monitor the progress of different advertising campaigns (e.g., by counting/tracking ads on a per-campaign basis). The ad serving system 214 is further configured to count clicks/impressions with respect to ads, in order to generate reports for visualizing the effectiveness of ads or ad campaigns.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 316) and images (for which data is stored in an image table 318).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 318 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A collection table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

Another type of story is a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

Another type of story is a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

Another type of story or collection is an "edition," which may be provided by a publisher and made accessible to multiple users (e.g., subscribers of the publisher) who select to view the edition. For example, a publisher may provide (e.g., upload to the collection management system 204) editions on a daily, weekly, monthly, or other periodic basis, and/or provide editions on a limited basis (e.g., for special events, circumstances, etc.). A publisher may correspond to a person (e.g., social media influencer, celebrity, etc.), company (e.g., television or film company, publisher of a periodical, a product/services company, etc.), or other entity capable of creating and publishing video content. With respect to viewing editions, the messaging client 104 may provide a user interface (e.g., a dedicated tab) which allows an end user to discover, browse, sort, view and/or otherwise access editions made available by a variety of publishers.

An ad table 314 stores (e.g., in conjunction with the ad serving system 214) data regarding ads, where each ad may include one or more of image data, video data, and/or audio data. An ad may be created by an advertiser, which may correspond to a person, company, or other entity responsible for creating ad content. In one or more embodiments, a record for each advertiser is maintained in the entity table 308. The ad table 314 may further store information for tracking a particular ad or ad set, where an ad set corresponds to a predefined grouping of ads (e.g., associated with an ad campaign). The ad table 314 may maintain counts for ads served, as well as counts for clicks/impressions associated with ads (e.g., on a per ad or per ad set basis).

As mentioned above, the video table 316 stores video data that, in one example, is associated with messages for which records are maintained within the message table 306. Similarly, the image table 318 stores image data associated with messages for which message data is stored in the entity table 308. The entity table 308 may associate various augmentations from the augmentation table 310 with various images and videos stored in the image table 318 and the video table 316.

Figure 4:
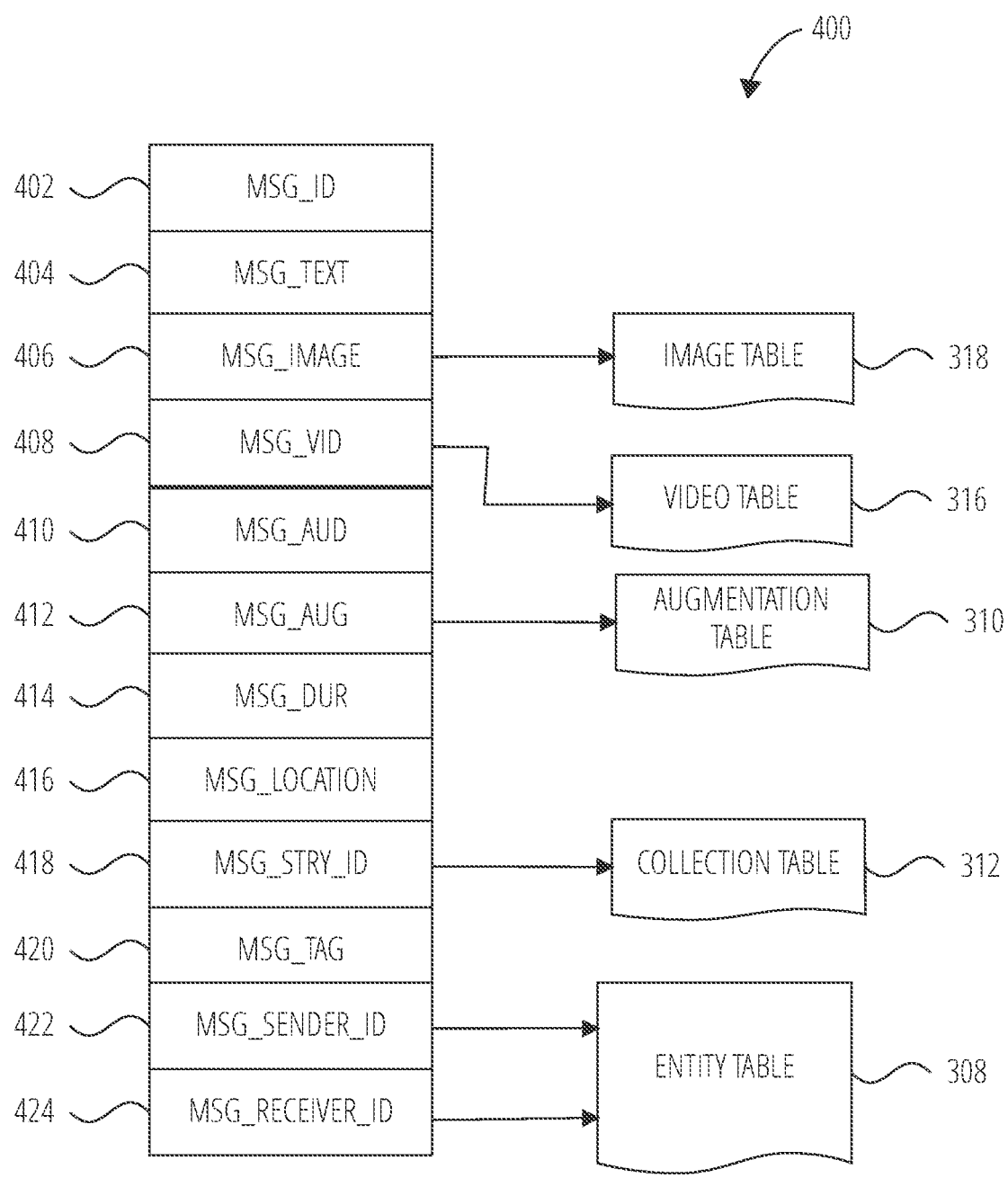
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 318.
- message video payload 408: video data, captured by a camera component or retrieved from a memory component of the client device 102, and that is included in the message 400. Video data for a sent or received message 400 may be stored in the video table 316.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the collection table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within a video table 316, values stored within the message augmentations 412 may point to data stored in an augmentation table 310, values stored within the message story identifier 418 may point to data stored in a collection table 312, and values stored within the message sender identifier 422 and the message receiver identifier 424 may point to user records stored within an entity table 308.

Figure 5:
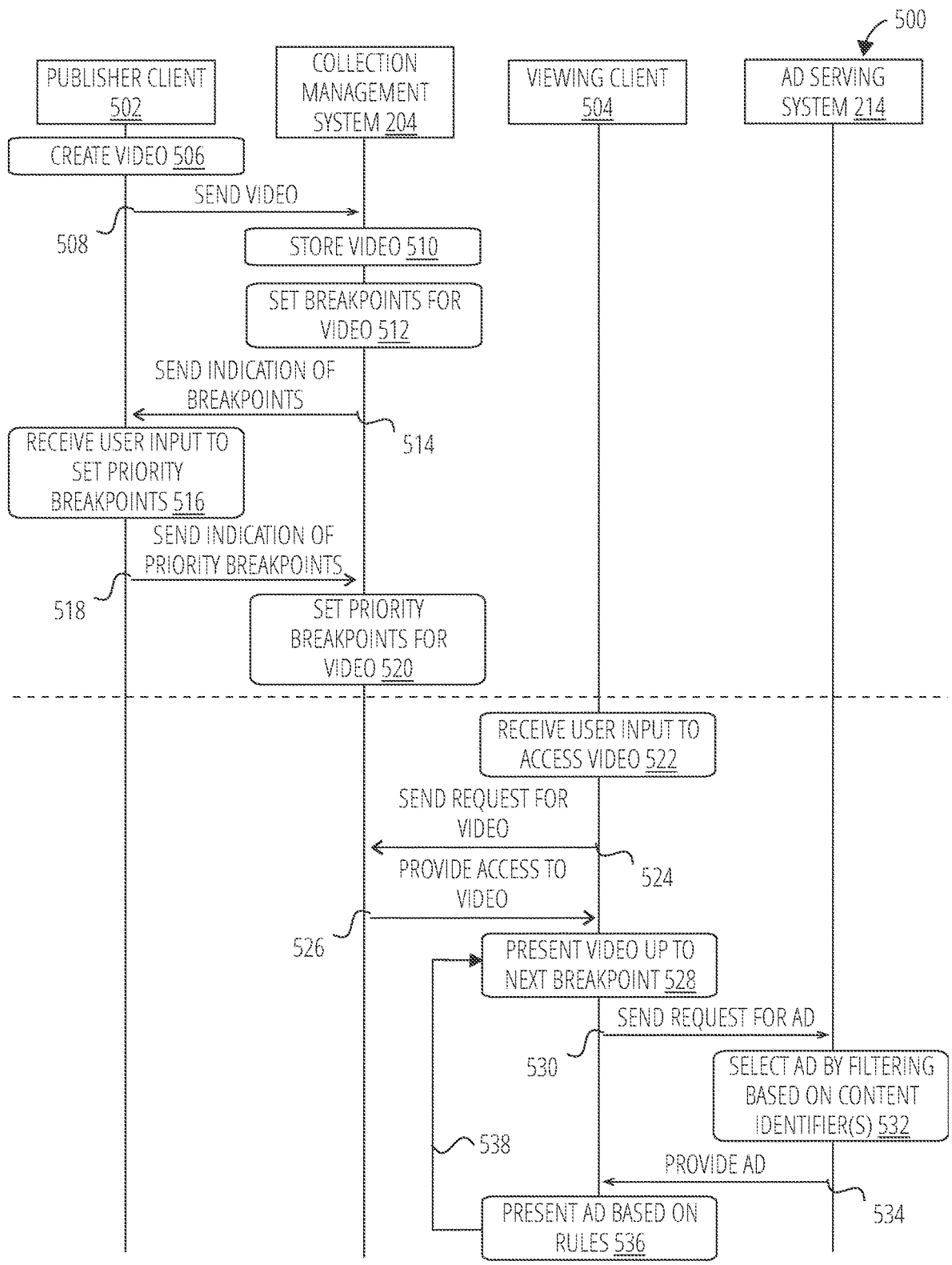
FIG. 5 is an interaction diagram illustrating a process for inserting ads into a video within a messaging system, in accordance with some example embodiments.

FIG. 5 is an interaction diagram illustrating a process 500 for inserting ads into a video within a messaging system, in accordance with some example embodiments. For explanatory purposes, the process 500 is primarily described herein with reference to a publisher client 502 and a viewing client 504 (e.g., each of which may correspond to a respective messaging client 104 of FIG. 1), as well as the collection management system 204 and the ad serving system 214 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The publisher client 502 corresponds to an instance of the messaging client 104 running on a respective client device 102 associated with a publisher. As noted above, a publisher may create and upload videos (e.g., editions) for sharing with multiple viewing users (e.g., subscribers). A publisher may correspond to a person (e.g., social media influencer, celebrity, etc.), company (e.g., television or film company, publisher of a periodical, a product/services company, etc.), and/or other entity capable of creating and publishing videos.

The viewing client 504 corresponds to an instance of the messaging client 104 running on a respective client device 102 associated with a viewing user. As described herein, the viewing user corresponds to an end user who selects to view video(s) (e.g., editions) created by the publisher of a video. For example, the viewing user may have subscribed to view videos created by the publisher. Alternatively, the viewing user may be a non-subscriber, who selected to play a particular video (e.g., edition) uploaded by the publisher to the collection management system 204.

Thus, each of the publisher client 502 and the viewing client 504 may be associated with a respective user of the messaging server system 108, with a respective user account on the messaging server system 108. As noted above, each user may be identified by the messaging server system 108 based on a unique identifier (e.g., a messaging system identifier, email address and/or a device identifier) associated with the user account for that user.

As described herein, the video created by the publisher may be analyzed by the collection management system 204, to determine multiple shot boundaries, and some of the shot boundaries may be selected as breakpoints for potential insertion of ads during playback of the video. The breakpoints may be selected based on a set of breakpoint tests (e.g., video fade-out, audio fade-out, transcript gaps, color differences, audio frequency differences, background audio characteristics, on-screen text, facial scans test, and/or machine learning). The publisher may also select to prioritize breakpoints for potential ad insertion. In addition, the publisher may select to remove/discard some of the automatically generated breakpoints.

When a breakpoint is reached during playback of the video on the viewing client 504, an ad may be selected by the ad serving system 214 and served to the viewing client 504. For example, server-side logic on the ad serving system 214 may provide for filtering ads with certain types of sensitive content based on similar or related types of sensitive content within the video. The viewing client 504 receives an ad selected by the ad serving system 214 based on the filtering, and determines whether to insert the ad at the breakpoint based on local, client-side rules. The client-side rules may prioritize inserting ads at prioritized breakpoints. In addition, the client-side rules may include timing requirements, such as a minimum amount of playback time and/or a minimum number of media content items that have played since the last ad (e.g., or since starting playback). Moreover, the client-side rules may provide further filtering of ads, to disallow or otherwise reduce the likelihood of inserting an ad with certain type(s) of content in between video content that is similar or otherwise related.

In the example of FIG. 5, operations 506-520 may correspond to a first phase and operations 522-536 may correspond to a second phase. The first phase relates to creation and storing of a video, as well as setting breakpoints for potential insertion of ads during playback of the video. The second phase relates to playback of the video, selecting ads based on server-side filtering logic, and inserting ads during playback based on the breakpoints and client-side rules for ad insertion. It may be understood that the second phase may occur shortly after the first phase, or after an extended period of time after the first phase. As such, FIG. 5 depicts a dashed line separating the first phase and the second phase for illustrative purposes.

With respect to the first phase, the publisher client 502 creates a video for uploading to the collection management system 204 (block 506). In one or more embodiments, the video corresponds to an edition created by the publisher for sharing with multiple viewing users (e.g., subscribers). For example, the edition may correspond to one of multiple editions created by the publisher on a daily, weekly, monthly, or other periodic basis, and/or on a limited basis (e.g., for special events, circumstances, etc.).

The publisher client 502 sends the video (e.g., edition) to the collection management system 204 (operation 508), which is configured to store and manage the edition (block 510). As noted above, the collection management system 204 may store the edition in conjunction with the collection table 312 and/or the video table 316. The collection management system 204 may provide for storing videos (e.g., editions) in a manner which provides an end user (e.g., viewing user) the ability to browse, search, preview and/or select editions with respect to a given publisher.

In one or more embodiments, the video is stored as a sequence of media content items. As noted above, a media content item includes one or more types of content, such as image, video, text and/or audio content. In addition, each media content item may be configured to be displayed for a preset amount of time (e.g., 8 seconds each).

At block 512, the collection management system 204 sets breakpoints for the video (block 512). In one or more embodiments, the collection management system 204 is configured to implement or otherwise access algorithm(s) for analyzing the video, in order to determine eligible breakpoints for potentially inserting ads during playback of the video.

To determine the breakpoints, the collection management system 204 may initially calculate a set of shot boundaries for the video, where a shot boundary separates adjacent shots of the video. A shot may correspond to a contiguous sequence of video frames that is free of cuts or transitions. For example, a shot has image continuity across a sequence of frames that runs for an uninterrupted period of time.

The collection management system 204 is configured to analyze the shots of the video, for example, in order to logically select which shot boundaries should be designated as breakpoints. As described herein, a breakpoint is a position in the video at which an ad may potentially be inserted during video playback. For example, the collection management system 204 may select breakpoints based on logic which is intended to maximize the likelihood that a viewing user will continue watching the video after the ad. As discussed below with respect to FIG. 7, the logical selection of breakpoints may be based on a predefined set of breakpoints tests, for grouping shots into one or more segments/scenes.

As an alternative to logical selection of breakpoints based on breakpoint tests, the collection management system 204 may be configured to simply set a breakpoint at each shot boundary, with possible exceptions. In one example exception, a breakpoint may not necessarily be set after the first shot boundary. Alternatively or in addition, a breakpoint may not necessarily be set to a media content item preceding a subscription media content item (e.g., which includes a "subscription" button for subscribing to the publisher).

Thus, the collection management system 204 is capable of employing different techniques/algorithms for detecting and setting breakpoints. In one or more embodiments, the technique/algorithm to be used is configurable, for example, by a system administrator. In this regard, the messaging client 104 may provide a user (e.g., system administrator) with interfaces for adjusting (e.g., tuning) how granular boundary detection should be. For example, the interfaces may allow the user to choose among one or more of logical selection of breakpoints (e.g., as discussed with respect to FIG. 7 below), and/or automatic selection of breakpoints between every fixed number of shots or media content items (e.g., barring the above-noted exceptions).

The collection management system 204 sends an indication of the breakpoints to the publisher client (operation 514). For example, the indication of breakpoints may correspond to a list or other data structure with index values of the shot boundaries at which an ad is eligible for insertion during playback of the video.

In one or more embodiments, the publisher client 502 is configured to present a user interface for an end user (e.g., the publisher and/or an authorized user associated with the publisher) to select one or more "priority breakpoints." As described herein, the messaging system 100 provides a user interface for the publisher and/or authorized user to view the video with eligible breakpoints, and to indicate a preferred position (e.g., one or more of the shot boundaries) in the video for placement of ads. Thus, the end user may designate one or more breakpoints, selected from among the multiple breakpoints set by the collection management system 204, as priority breakpoints for potential ad insertion (block 516). In this manner, the publisher may override the initial designation of a breakpoint from "eligible" to "priority." In one or more embodiments, the publisher can also remove "eligible" breakpoints.

The publisher client 502 sends an indication of the priority breakpoints to the collection management system 204 (operation 518). For example, the indication of priority breakpoints may specify which of the breakpoints within the video have been selected by the publisher as priority breakpoints. In response to receiving the indication, the collection management system 204 sets the priority breakpoints for the video (block 520).

Thus, regarding the first phase, the collection management system 204 is configured to store a video created by a publisher. The collection management system 204 is further configured to set breakpoints, including eligible breakpoints and priority breakpoints, for particular shot boundaries within the video.

With respect to operations 522-536 corresponding to the above-noted second phase, a viewing user chooses to playback the video, and the messaging system 100 provides for inserting ads into the video during playback. At block 522, the viewing client 504 receives user input to access the video. As noted above, the messaging client 104 may provide a user interface (e.g., a dedicated tab) which allows the viewing user to search, browse, sort, preview, view and/or access videos (e.g., editions) made available by publisher(s).

The viewing client 504 sends, to the collection management system 204, a request for the video (operation 524). In response, the collection management system 204 provides the viewing client 504 with access to the video (operation 526). The collection management system 204 provides the messaging client 104 with appropriate code and/or application interfaces for presenting the video within the messaging client 104. In one or more embodiments, the collection management system 204 may be configured to provide the video content to the viewing client 504 on a per media content item basis, per shot basis, per segment basis, and/or per video basis (e.g., the entirety of the video).

At block 528, the viewing client 504 presents (e.g., plays back) the video up to the next breakpoint. Playback of the video may be initiated from the beginning, for example, in a case where the user had not selected (e.g., via a video slider interface) a position in the video from which to start playback. In a case where the user did select a position from which to start playback, playback is initiated from the selected position (e.g., the media content item corresponding to the selected position).

As noted above, the breakpoint may have been set after a particular segment (e.g., grouping of shots based on breakpoint tests), or may have been set after every shot, barring exceptions. Upon reaching the next breakpoint, the viewing client 504 sends, to the ad serving system 214, a request for an ad (operation 530).

As noted above, the ad serving system 214 is configured to store ads, and to serve ads for inserting into breakpoints. In serving the ads, the ad serving system 214 may implement or otherwise access algorithms (e.g., server-side algorithms) for filtering ads based on sensitive content that may appear in the video and/or in available ads (e.g., ad inventory). For example, such filtering may prevent or otherwise reduce the likelihood of serving an ad with a specific type of sensitive content for a video with the same (or related) type of sensitive content.

In this regard, the messaging system 100 may be configured to tag videos (e.g., and/or the individual media content items of a video), and/or to tag ads with content identifiers, where each content identifier indicates a different type of sensitive content. The different types of sensitive content may include, but are not limited to: business trouble; controversial social issues; death and tragedy; drugs and alcohol; protests and political conflict; profanity and rough language; sensational and shocking; sexually suggestive; war, crime and conflict; and weapons and firearms. Thus, particular videos (or media content items) stored in the collection management system 204 and/or particular ads stored in the ad serving system 214 may have been previously tagged (e.g., using metadata) with one or more content identifiers, each indicating a respective type of sensitive content.

In one or more embodiments, the tagging of media content items, videos, and/or ads may be performed manually (e.g., where a human user views the content, and assigns corresponding tag(s)). Alternatively or in addition, the tagging of media content items, videos, and/or ads may be performed in an automated manner (e.g., by a machine learning model). For example, the machine learning model may have been trained with samples of media content items, videos, and/or ads, together with their respective types of sensitive content. Following training, the machine learning model may be configured to receive different media content items, videos, and/or ads as input, and to output indications (e.g., content identifiers) of the respective type(s) of sensitive content.

Moreover, the messaging system 100 may predefine groupings (e.g., or mappings) of content identifiers that are deemed to be similar or otherwise related to one another. By way of non-limiting example, one grouping of related types of sensitive content includes: death and tragedy; war, crime and conflict; and weapons and firearms.

Thus, the request for the ad at operation 530 may include any content identifiers with which the video was tagged. In one or more embodiments, this may include the union of content identifiers for all of the media content items included within the video.

At block 532, the ad serving system 214 selects an ad by performing filtering based on the content identifier(s) associated with the video, and on the content identifier(s) associated with available ads. For example, the video may be tagged with a first content identifier (e.g., indicating death and tragedy). The ad serving system 214 determines, based on the groupings or mappings of related sensitive content types, a set of content identifiers associated with the first content identifier (e.g., death and tragedy; war, crime and conflict; and weapons and firearms as discussed above).

The ad serving system 214 may implement or otherwise access various algorithms (e.g., server-side algorithms) for filtering ads in different manners. In a first example, the ad serving system 214 may filter out (e.g., block) individual ads, available in an ad inventory, that are tagged with a content identifier appearing within the set of content identifiers.

In a second example, the ad serving system 214 may filter out ads based on ad sets, where an ad set corresponds to a predefined grouping of ads (e.g., associated with an ad campaign). In one or more embodiments, the ad serving system 214 is configured to detect that a particular ad set includes one or more ads (e.g., based on a union of all ads in the ad set) tagged with a content identifier appearing within the set of content identifiers. In response to such detection, the ad serving system 214 filters out all ads within the ad set.

In a third example, the ad serving system 214 may filter ads based on a pass list (e.g., a list of allowed or preferred types of content). In addition to the above-mentioned types of sensitive content, the messaging system 100 may be configured to tag videos (e.g., or the individual media content items of a video), and/or to tag ads with content identifiers indicating different types of positive (e.g., pass listed) content. Moreover, the messaging system 100 may predefine groupings (e.g., or mappings) of content identifiers for allowing or otherwise preferring with respect to one another (e.g., video content with sensitive content relating to death and tragedy may allow or otherwise prefer positive ad content related to donations and charity).

It is noted that the above three examples are non-limiting, and that other examples of filtering ad content may be used. In addition, it is possible for the ad serving system 214 to employ a combination of the above-mentioned filtering algorithms (as well as others) in order to serve an ad for potentially inserting into a breakpoint of the video.

Following selection of an at block 532, the ad serving system 214 provides the ad to the viewing client 504 (operation 534). In response to receiving the ad, the viewing client 504 presents the ad in conjunction with dynamic, client-side insertion rules, as discussed below with respect to FIG. 6. Moreover, as shown by arrow element 538, the process 500 may continue repeating operations 528-536 for insertion of ads at subsequent breakpoints with respect to the remainder of the video.

Figure 6:
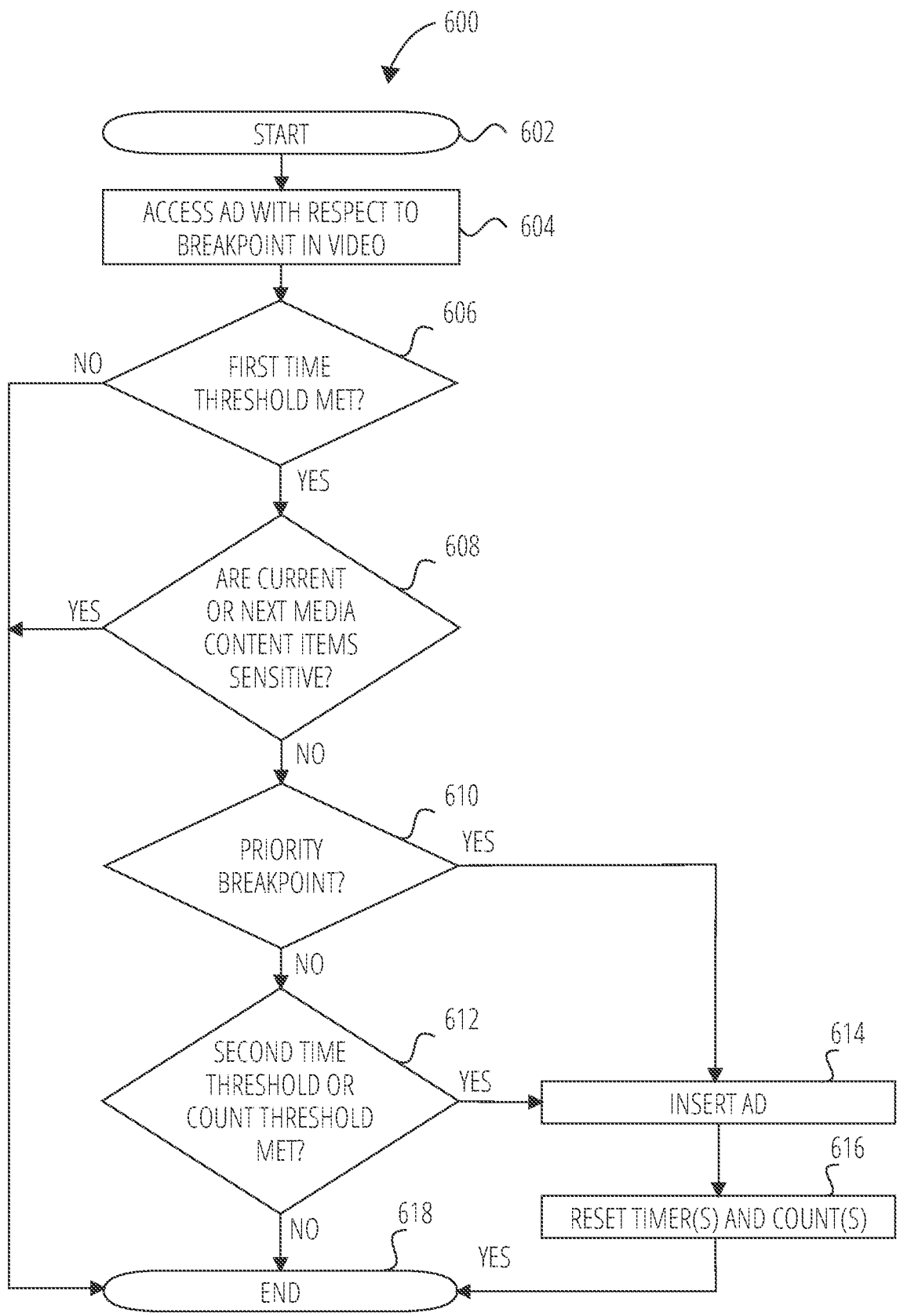
FIG. 6 is flowchart illustrating a process for inserting ads into a video based on client-side rules, in accordance with some example embodiments.

FIG. 6 is flowchart illustrating a process 600 for inserting ads into a video based on client-side insertion rules, in accordance with some example embodiments. For explanatory purposes, the process 600 is primarily described herein with reference to the messaging client 104 of FIG. 1. However, one or more blocks (or operations) of the process 600 may be performed by one or more other components, and/or by other suitable devices. Further for explanatory purposes, the blocks (or operations) of the process 600 are described herein as occurring in serial, or linearly. However, multiple blocks (or operations) of the process 600 may occur in parallel or concurrently. In addition, the blocks (or operations) of the process 600 need not be performed in the order shown and/or one or more blocks (or operations) of the process 600 need not be performed and/or can be replaced by other operations. The process 600 may be terminated when its operations are completed. In addition, the process 600 may correspond to a method, a procedure, an algorithm, etc.

As discussed above with respect to block 536 of FIG. 5, the messaging client 104 (e.g., corresponding to the viewing client 504) is configured to insert ads received from the ad serving system 214 into a video based on one or more dynamic, client-side insertion rules. In general, the dynamic, client-side insertion rules provide for inserting a received ad at a given breakpoint:

IF ((video playback time since last ad≥first time threshold AND breakpoint is priority) OR (video playback time since last ad≥second time threshold OR count of media content items played since last ad≥count threshold)) AND (current media content item is not sensitive) and (next media content is not sensitive)

Thus, following start block 602, the messaging client 104 accesses the ad provided by the ad serving system 214 (e.g., at operation 534 of FIG. 5) with respect to a breakpoint in the video (block 604).

At decision block 606, the messaging client 104 determines whether the amount of video playback time since the last ad (or since starting video if no ads have been presented), meets a first time threshold. For example, the first time threshold corresponds to a minimum amount of playback time (e.g., 20 seconds of playback time since the last ad or since starting the video) required before inserting an ad with respect to the current breakpoint. If the first threshold time is not met, the ad is not inserted into the breakpoint.

If the first time threshold is met, the messaging client 104 determines whether either the current media content item or the next media content item (e.g., the content items adjacent to the breakpoint) include sensitive content (decision block 608). As noted above, the messaging system 100 is configured to tag media content items, as well as ads, with content identifiers corresponding to respective types of sensitive content. In one or more embodiments, the messaging client 104 may prevent any ads from being presented in association with a breakpoint in which the current or next media content items are tagged with a content identifier corresponding to sensitive content.

Alternatively or in addition, the messaging client 104 may prevent ads with certain types of sensitive content from being presented directly before and/or after a media content item having the same (or related) type of sensitive content. In doing so, the messaging client 104 may provide for pass listing predefined types of sensitive content associated with an ad, while filtering out other predefined types of sensitive content. For example, if an adjacent media content item is tagged with death and tragedy, the messaging client 104 may pass list an ad tagged with business trouble, while filtering out other types of sensitive content.

Thus, if the current or next media content items include sensitive content (subject to the above-noted filtering out and/or pass listing), the ad is not inserted into the breakpoint. Otherwise, the messaging client 104 determines whether the breakpoint is a priority breakpoint (decision block 610), and if so, inserts the ad into the breakpoint (block 614). For example, inserting the ad corresponds with playing the ad and resuming playback of the video after the ad.

If the breakpoint is not a priority breakpoint, the messaging client 104 determines whether either a second time threshold is met or a count threshold is met (decision block 612). For example, the second time threshold corresponds to a minimum amount of playback time (e.g., 40 seconds of playback time since the last ad or since starting the video) required for a non-priority breakpoint. Moreover, the count threshold corresponds to a minimum the number of media content items (e.g., 7 media content items) required to play for a non-priority breakpoint. If neither the second time threshold nor the count threshold are not met, the ad is not inserted into the breakpoint. Otherwise, the ad is inserted (block 614).

As noted above with respect to block 532 of FIG. 5, the ad serving system 214 may have previously filtered ads based on server-side logic. This may correspond to a first stage of filtering, and the client-side rules may correspond to a second stage of filtering. In this regard, the granularity with which filtering occurs on the server side and/or the client side may be user-adjustable, for example, by a system administrator.

For example, the above-noted types of sensitive content with respect to the above-noted pass listing and/or filtering out may be user-adjustable (e.g., by a system administrator). In this manner, the system administrator may provide configuration data with respect to filtering by ad content.

Moreover, one or more of the first time threshold, the second time threshold and/or the count threshold may be an adjustable setting which can be set by a user (e.g., a system administrator). In this manner, the system administrator may provide configuration data with respect to the frequency of ad insertion. In one or more embodiments, and with appropriate user permissions (e.g., viewing user opt-in), the frequency of ad insertion may be based on profile data associated with the viewing user (e.g., age, geolocation, engagement with ads/content based on viewing history, etc.).

Following the insertion of an ad, the messaging client 104 at block 616 provides for resetting the timer(s) and count(s). For example, the messaging client 104 resets timer(s) that track the video playback time since the last ad, and resets count(s) that track the count of media content items played since last ad. The process 600 ends at end block 618.

Figure 7:
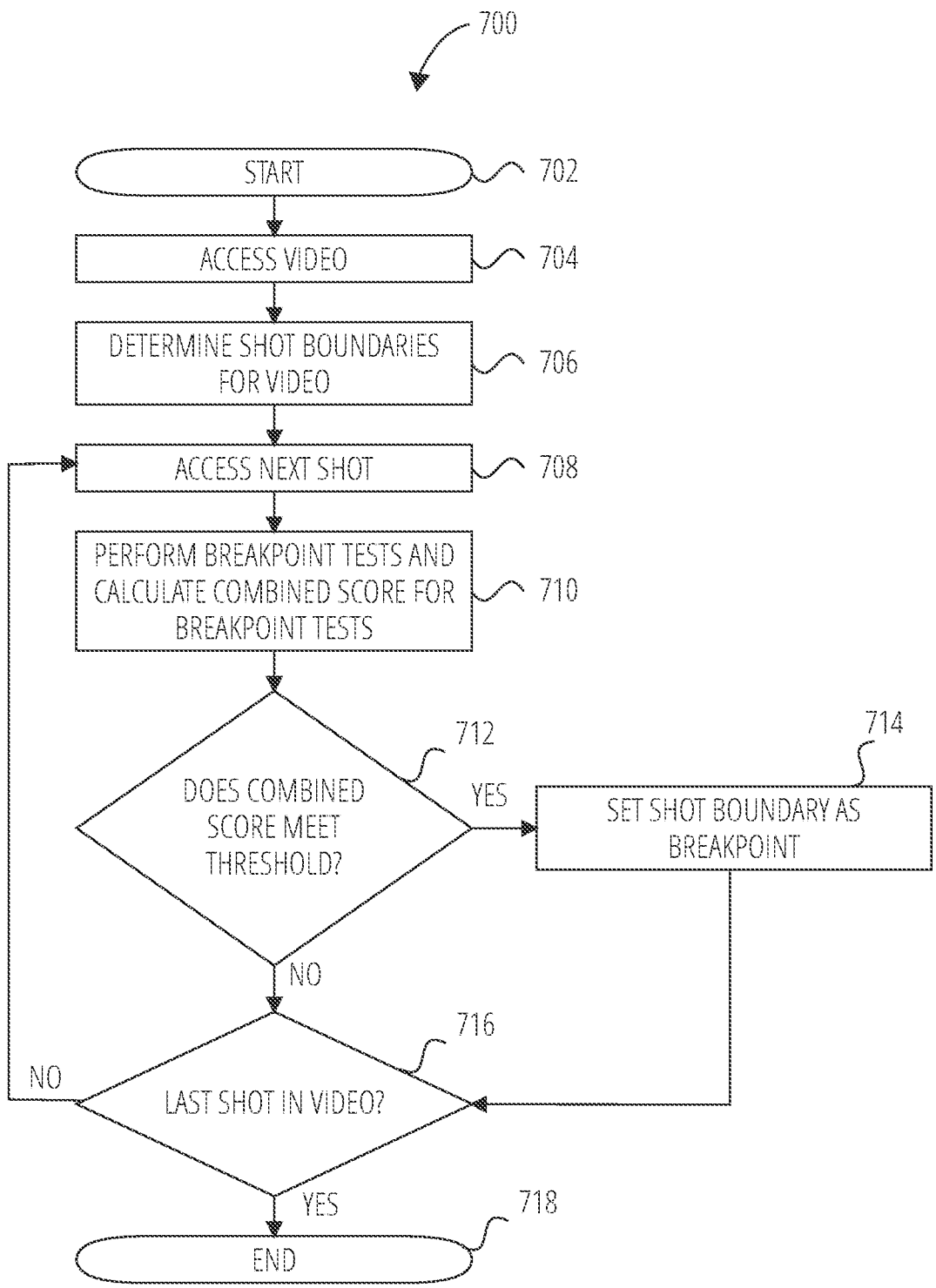
FIG. 7 is flowchart illustrating a process for setting eligible breakpoints for a video, in accordance with some example embodiments.

FIG. 7 is flowchart illustrating a process 700 for setting eligible breakpoints for a video, in accordance with some example embodiments. For explanatory purposes, the process 700 is primarily described herein with reference to the collection management system 204 of FIG. 2. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

As discussed above with respect to block 512 of FIG. 5, the collection management system 204 is configured to implement or otherwise access algorithms for analyzing the shots of a video, in order to logically select which shot boundaries should be designated as breakpoints. The logical selection of breakpoints may be based on a predefined set of breakpoints tests, for grouping shots into one or more segments.

In one or more embodiments, a segment corresponds to a scene, for example, a section of a video (e.g., movie) in a single location and continuous time made up of a series of shots, which are each a set of contiguous frames from individual cameras from varying angles. By grouping shots into segments/scenes, and by setting a breakpoint after every segment/scene (as opposed to after every shot boundary), it is possible to increase the likelihood that a viewing user will continue watching the video after the ad.

Following start block 702, the collection management system 204 accesses a video (block 704). For example, the video is accessed based on receiving the video per operation 508 and storing the video per block 510 of FIG. 5. The collection management system 204 determines shot boundaries for the video (block 706).

To determine shot boundaries, the collection management system 204 analyzes the video from beginning to end (e.g., from the first frame to the last frame), to detect which contiguous sets of frames are between respective video transitions. For example, each shot has image continuity across a sequence of frames that runs for an uninterrupted period of time without presenting one or more of: a jump cut (e.g., when there is no transition at all between one video clip and the next), a blank frame or other type of frame transition (e.g., a cut that combines two frames together), a fade (where a frame slowly turns black), a dissolve (where a frame slowly disappears and another adjacent frame slowly appears), a wipe (where a frame slowly slides off the screen and an adjacent frame slides into the screen), and so forth between the given sequence of frames. In one or more embodiments, the collection management system 204 may employ frame-pairwise pHash thresholding to detect shot boundaries.

As noted above, a video is composed of multiple media content items, each of which may be configured to be displayed for a preset amount of time (e.g., 8 seconds). In one or more embodiments, the collection management system 204 may set a given shot boundary to coincide with a respective media content item boundary (e.g., the boundary between two adjacent media content items). Alternatively or in addition, it is possible for the collection management system 204 to set a given shot boundary within the media content item, for example, in a case where a transition appears in the middle of a media content item.

With respect to operations 708-716, the collection management system 204 is configured to perform a set of breakpoint tests for each shot boundary, to determine which shot boundaries to designate as a breakpoint. For example, a breakpoint logically separates segments (e.g., or scenes).

Thus, at block 708, the collection management system 204 accesses a next shot (e.g., beginning with the first shot). At block 710, the collection management system 204 performs the set of breakpoint tests with respect to the accessed shot, and calculates a combined score of the breakpoint tests for the corresponding shot boundary. Each breakpoint test within the set of breakpoint tests returns a respective score. The score indicates whether the shot boundary should be set as a breakpoint for that breakpoint test.

For example, each breakpoint test may be configured to return a score of either 0 (e.g., indicating that the shot does not correspond to a breakpoint) or 1 (e.g., indicating that the shot corresponds to a breakpoint). Alternatively, each breakpoint test may be configured with respective weighted scores, such that some breakpoint test(s) are prioritized or otherwise biased relative to other breakpoint test(s).

The collection management system 204 at block 710 further calculates a combined score (e.g., total score) based on the individual breakpoint scores for the current breakpoint. In one or more embodiments, the combined score is calculated as the linear combination of the individual breakpoint scores. As noted, the individual scores can be equally weighted (e.g., with a score of 0 or 1 being available for each breakpoint test), or can be weighted differently for each breakpoint test.

In one or more embodiments, the set of breakpoint tests includes one of more of the following: a video fade-out test, an audio fade-out test, a mean audio volume test, a transcript gap test, a color histogram test, a dominant color test, an audio frequency histogram test, a background audio test, an on-screen text test, a facial scan test, and/or a machine learning-based test.

The video fade-out test is configured to detect a video fade-out between adjacent shots corresponding to the shot boundary. For example, in traditional, linear television content, commercial breaks (e.g., corresponding to breakpoints) may be incorporated directly into the production process. One indication of a commercial break is when the screen fades to black. The collection management system 204 may implement or otherwise access algorithm(s) for detecting a fade-out. Alternatively or in addition, the collection management system 204 may be configured to detect a black frame at the end of a shot (e.g., as a proxy to detecting a fade-out).

The audio fade-out test is configured to detect an audio fade-out between adjacent shots corresponding to the shot boundary. For example, an audio volume fade-out (e.g., when background music fades out) may indicate a break in the action. The collection management system 204 may implement or otherwise access algorithm(s) for detecting audio fade-out. For example, the collection management system 204 may at least in part compare the average volume (e.g., in loudness unit full scale, or LUFS) of the last portion (e.g., second) of one shot to the first portion of the following shot. If the difference is above a threshold, this might indicate a scene/segment change (e.g., breakpoint).

The mean audio volume test is configured to detect loud audio (e.g., corresponding to an action shot which should not be interrupted by an ad). For a given shot boundary, a window of audio of a fixed duration around that shot boundary (e.g., 100 ms on either side of the shot boundary) is considered. The average loudness of the audio is computed in that excerpt. Shot boundaries that have audio that is on average very loud tend not to make for good ad insertion points, since the loud audio is typically indicative of some action happening at the shot boundary, and that action should not be interrupted by an ad.

The transcript gap test is configured to detect a pause in speech between adjacent shots corresponding to the shot boundary, based on timestamps of a transcript for the adjacent shots. For example, scene/segment changes may often be associated with pauses in speech. The collection management system 204 may implement or otherwise access speech-to-text algorithm(s) to generate a transcript with timestamps for the video (e.g., including the shots adjacent to the shot boundary). A threshold gap between utterances around the shot boundary may indicate a breakpoint with respect to the transcript gap test.

The color histogram test is configured to detect a threshold difference in color content between adjacent shots corresponding to the shot boundary, based on respective color histograms for the adjacent shots. For example, a scene/segment change may occur when the on-camera action shifts from one physical location to another. In another example, a shift from live-action camera footage to a graphic/titles shot may indicate a scene/segment change. In each of these examples, the typical color content of the frames in the previous and succeeding shots may be significantly different (e.g., it is noted that the pHash algorithm used for shot detection may discard color information). The collection management system 204 may be configured to implement or otherwise access algorithm(s) to detect adjacent shots with a threshold difference in color content. For example, the collection management system 204 may (1) build a single color histogram for all the frames of each shot, (2) implement a distance metric on these histograms (e.g., earth mover's distance), and (3) use thresholding to identify pairs of shots with especially distant histograms. In this example, each bin in the histogram may describe the number of red, green or blue pixels of a certain range of values (e.g., 0-32, 33-64, . . . 223-255).

The dominant color text is configured to detect a dominant color with respect to video frames. For a given shot boundary, the pair of video frames on either side of the boundary is considered. For each frame of video, the dominant color of the image is calculated, which is a single color that best reflects the overall color of the image. For example, the dominant color is calculated using known methods. The distance between dominant colors of the frames on either side of the shot boundary is indicative of the similarity between the two adjacent shots. For example, if the dominant colors are very distant, then the shots may be from different scenes. However, if the dominant colors are very near, then the shots may be of the same scene. By considering positive and negative examples, a dominant color distance threshold may be selected that distinguishes the shot boundaries likely to be scene boundaries from those that are more likely to separate shots within a scene.

The audio frequency histogram test is configured to detect a threshold difference in audio content between adjacent shots corresponding to the shot boundary, based on respective audio frequency histograms for the adjacent shots. For example, significant changes in the audio content between adjacent shots may indicate a scene/segment change. Similar to the color histograms noted above, the collection management system 204 may implement or otherwise access algorithm(s) to employ histograms and thresholding with respect to audio frequency histograms. In this example, each "bin" in the histogram may describe the fraction of time in a given shot in which a range of frequencies occur (e.g., 16-32 Hz, 32-512 Hz, . . . , 16-32 kHz) multiplied by the average volume level of that range of frequencies.

The background audio test is configured to group one or more adjacent shots in the video based on background audio shared by the one or more adjacent shots. For example, background audio may indicate a scene/segment change (e.g., music is added or removed, ambient sound changes, and/or different frequencies of background white noise from recording in different locations become more prominent). The collection management system 204 may implement or otherwise access algorithm(s) to extract background audio (e.g., by first extracting the spoken audio, then inverting the resulting waveform and combining it with the source audio to remove the spoken audio). Alternatively or in addition, the collection management system 204 may implement or otherwise access algorithm(s) to remove vocals by assuming they are mixed to the center audio channel (e.g., removing everything that appears equally in both the left and right channel). The collection management system 204 may determine the loudness and most prominent frequencies of the audio during the time of a given shot, and compute a distance calculation of the audio in neighboring shots to group shots together into scenes/segments.

The on-screen text (caption) test is configured to detect a threshold difference in displayed text between adjacent shots corresponding to the shot boundary. For example, the presence of on-screen text may indicate a scene/segment change. The collection management system 204 may implement or otherwise access algorithm(s) to detect graphical intermissions (e.g., associated with on-screen text) based on thresholding to detect scene/segment changes (e.g., corresponding to a breakpoint).

The facial scan test is configured to detect a threshold difference in faces recognized between adjacent shots corresponding to the shot boundary. For example, a change in faces depicted in video (e.g., indicating different people as opposed to different views of the same people) may indicate scene/segment changes. The collection management system 204 may implement or otherwise access algorithm(s) to detect a set of individuals in video (e.g., via their faces), and to determine if the set of individuals has changed. A threshold change composition and/or number of individuals may indicate a scene/segment change. In one or more embodiments, the collection management system 204 does not necessarily identify individuals (e.g., based on comparing detected faces against a database storing face and/or other identifying information), but rather anonymously detects different faces locally at the client device 102 for purposes of determining if faces change between shots.

The machine learning-based test is configured to provide one or more shots corresponding to the shot boundary as input to a machine learning model. The machine learning model is configured to output a score indicating that the shot boundary corresponds to a breakpoint (e.g., screen/segment change) based on the input of the one or more shots. For example, the machine learning model may be trained with existing television scripts with additional natural language processing (NLP) annotations, such as sentiment analysis, emotional analysis, punctuation, timestamps, keywords (e.g., "up next", "stick around"), etc. along with the already existing ad placements in those scripts. The collection management system 204 may be configured to implement or otherwise access the machine learning model with respect to determining new ad placements (e.g., breakpoints) in scripts from video(s).

As noted above with respect to block 706, the collection management system 204 is configured to determine shot boundaries (e.g., based on frame-pairwise pHash thresholding) for the video. In some cases, it is possible for detected shot boundaries to include false positives (e.g., where too many shots boundaries instead of too few are detected). For example, a pHash threshold may initially be set to be biased towards false positives (e.g., to address editing challenges). A false positive may not be a suitable scene boundary since it corresponds to the middle of a true shot. Hence, in one or more embodiments, the collection management system 204 may increase the likelihood that a shot boundary is a suitable scene boundary, by increasing the threshold at which a pair of frame pHashes triggers as a shot boundary. For example, the threshold may be a setting that is adjustable by a system administrator. Moreover, the levels by which the threshold may be increased are set so as to minimize risk of a false negative (e.g., where shot boundary is omitted from consideration entirely).

As noted above, the collection management system 204 calculates a combined (e.g., total) score based on the individual breakpoint test scores. The collection management system 204 determines whether the combined score meets a threshold value (decision block 712). In a case where the threshold value is met, the collection management system 204 sets the shot boundary as a breakpoint (block 714). Otherwise, the collection management system 204 continues to the next shot in the video (per block 708) until all shots in the video have been evaluated (based on decision block 716). The process then ends at end block 718.

FIGS. 8A-8B and 9A-9B illustrate examples of setting breakpoints for a video 802. For example, the video may correspond to an edition which includes a sequence of multiple media content items. Each multimedia content item is configured to be displayed for a present amount of time (e.g., 8 seconds). As noted above, the video may have been submitted to the collection management system 204 by a publisher via the publisher client 502.

Figure 8A:
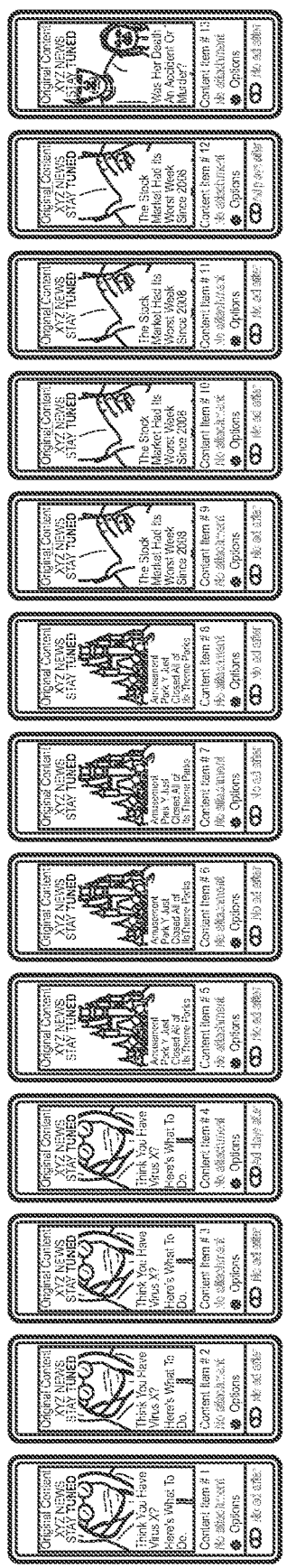
FIG. 8A illustrates an example of a video with plural media content items, in accordance with some example embodiments.

FIG. 8A illustrates an example of the video 802 with plural media content items, in accordance with some example embodiments. In the example of FIG. 8A, the media content items are labeled as "content item #1" to "content item #13," for illustrative purposes.

As depicted in the example of FIG. 8A, the video 802 indicates that an "ad plays after" content item #4 and content item #12. For example, this spacing of ads may be based on a predefined configuration for inserting ads (e.g., where an ad is predefined to be inserted after the fourth media content item and after the twelfth media content item for videos).

Figure 8B:
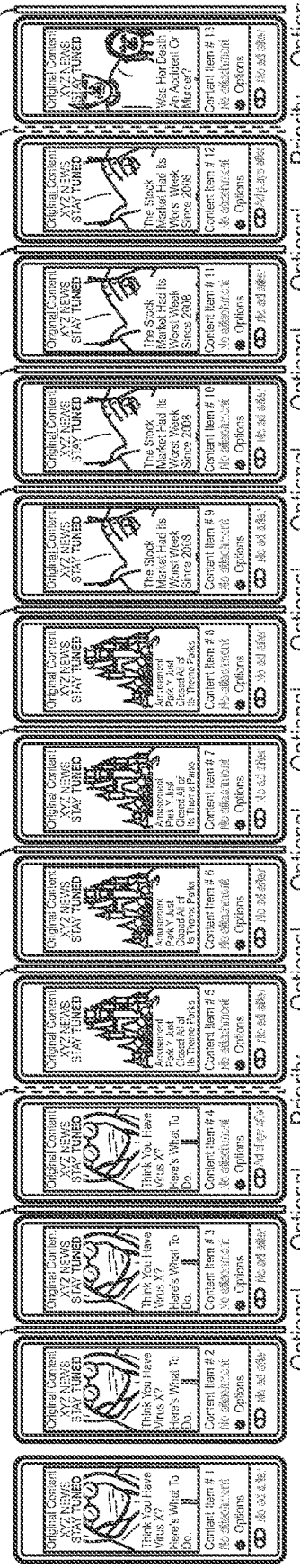
FIG. 8B illustrates an example of setting eligible and priority breakpoints for a video, in accordance with some example embodiments.

FIG. 8B illustrates an example of setting eligible and priority breakpoints for the video 802, in accordance with some example embodiments. In the example of FIG. 8B, the collection management system 204 sets a breakpoint after every media content item, with the exception of the first content item #1, and with the exception of the media content item preceding a subscription content item (not shown). Thus, in the example of FIG. 8B, breakpoints 804-806, 810-822 and 826 correspond to eligible breakpoints (depicted as vertical bars in solid outline). In addition, breakpoints 808 and 824 correspond to priority breakpoints (depicted as vertical bars in dotted outline).

As noted above, priority breakpoints may be designed by the publisher (or authorized user) to indicate a preferred position in the video for placement of ads. However, it is possible for priority breakpoints to be set without being explicitly designated by the publisher. For example, in FIG. 8B, the priority breakpoint 808 and the priority breakpoint 824 may be set based on the predefined configuration for spacing ads (e.g., after the fourth and twelfth media content items) discussed above with respect to FIG. 8A. Such setting of priority breakpoints (e.g., which are not explicitly set by a publisher) may be based on configuration settings of the messaging system 100 that allow the collection management system 204 to set/adjust priority breakpoints. In the example of FIG. 8B, all remaining breakpoints 804-806, 810-822 and 826 are set as eligible breakpoints.

While the example of FIG. 8B shows the setting of breakpoints after every media content item (e.g., barring exceptions), it is noted that breakpoints may be set in different manners as described above with respect to FIGS. 5 to 7. For example, breakpoints may be set between all shot boundaries (e.g., barring exceptions, and where some shot boundaries may be within a media content item), and/or may be set based on logical selection of breakpoints (e.g., scene/segment changes) using a set of breakpoint tests.

FIG. 9A illustrates an example of setting media content items as sensitive, in accordance with some example embodiments. As noted above, the messaging client 104 in some embodiments is configured to prevent or otherwise reduce the likelihood of inserting ads for a breakpoint in which the current or next media content items are tagged with a content identifier corresponding to sensitive content. As shown in the example of FIG. 9A, content item #1 to content item #4 are tagged as sensitive (e.g., depicted as sensitive tags 902). As such, the messaging client 104 may prevent/reduce the likelihood of inserting an ad following content item #4, as discussed below with respect to FIG. 9B.

FIG. 9B illustrates an example of adjusting breakpoints for the video 802 having media content items set to sensitive, in accordance with some example embodiments. As noted above, content item #4 is tagged with sensitive content. Thus, the priority breakpoint 808 of FIG. 9A may be replaced with an eligible breakpoint 904. The priority breakpoint may be shifted, for example, by replacing the eligible breakpoint 810 of FIG. 9A with the priority breakpoint 906 shown in FIG. 9B. Such shifting may be based on configuration settings of the messaging system 100 that allow the collection management system 204 (as opposed to the publisher) to set/adjust priority breakpoints.

Figure 10:
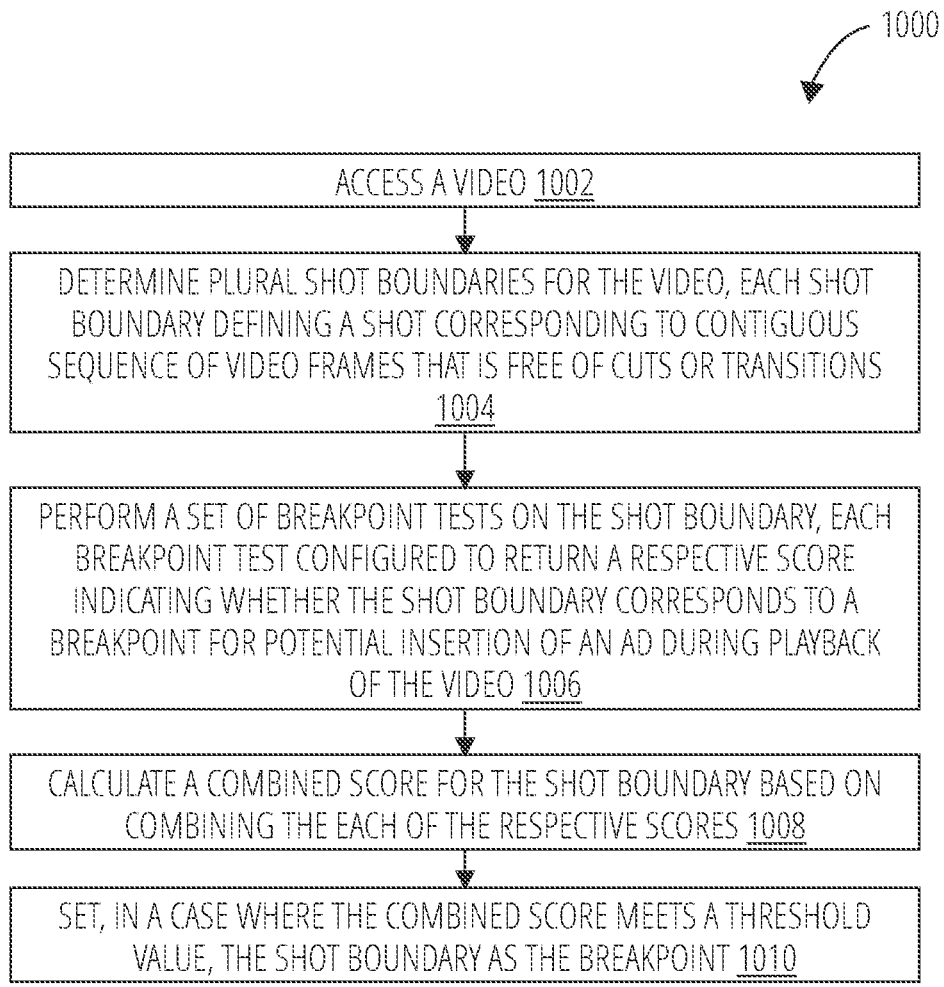
FIG. 10 is a flowchart illustrating a process for setting breakpoints in a video, in accordance with some example embodiments.

FIG. 10 is a flowchart illustrating a process 1000 for setting breakpoints in a video, in accordance with some example embodiments. For explanatory purposes, the process 1000 is primarily described herein with reference to the collection management system 204 of FIG. 2. However, one or more blocks (or operations) of the process 1000 may be performed by one or more other components, and/or by other suitable devices. Further for explanatory purposes, the blocks (or operations) of the process 1000 are described herein as occurring in serial, or linearly. However, multiple blocks (or operations) of the process 1000 may occur in parallel or concurrently. In addition, the blocks (or operations) of the process 1000 need not be performed in the order shown and/or one or more blocks (or operations) of the process 1000 need not be performed and/or can be replaced by other operations. The process 1000 may be terminated when its operations are completed. In addition, the process 1000 may correspond to a method, a procedure, an algorithm, etc.

The collection management system 204 accesses a video (block 1002). The collection management system 204 determines plural shot boundaries for the video, each shot boundary defining a shot corresponding to a contiguous sequence of video frames that is free of cuts or transitions (block 1004). In one example, determining the shot boundaries may be based on frame-pairwise pHash thresholding which is adjustable by a system administrator for limiting at least one of false positives or false negatives.

For each shot boundary of the plural shot boundaries, the collection management system 204: performs a set of breakpoint tests on the shot boundary, each breakpoint test configured to return a respective score indicating whether the shot boundary corresponds to a breakpoint for potential insertion of an ad during playback of the video (block 1006), calculates a combined score for the shot boundary based on combining the each of the respective scores (block 1008), and sets, in a case where the combined score meets a threshold value, the shot boundary as the breakpoint (block 1010).

The set of breakpoint tests may include a video fade-out test configured to detect a video fade-out between adjacent shots corresponding to the shot boundary, and to return a score indicating that the shot boundary corresponds to the breakpoint based on the detecting. The set of breakpoint tests may include an audio fade-out test configured to detect an audio fade-out between adjacent shots corresponding to the shot boundary, and to return a score indicating that the shot boundary corresponds to the breakpoint based on the detecting.

The set of breakpoint tests may include a transcript gap test configured to detect a pause in speech between adjacent shots corresponding to the shot boundary, based on timestamps of a transcript for the adjacent shots, and to return a score indicating that the shot boundary corresponds to the breakpoint based on the detecting. The set of breakpoint tests may include a color histogram test configured to detect a threshold difference in color content between adjacent shots corresponding to the shot boundary, based on respective color histograms for the adjacent shots, and to return a score indicating that the shot boundary corresponds to the breakpoint based on the detecting.

The set of breakpoint tests may include an audio frequency histogram test configured to detect a threshold difference in audio content between adjacent shots corresponding to the shot boundary, based on respective audio frequency histograms for the adjacent shots, and to return a score indicating that the shot boundary corresponds to the breakpoint based on the detecting. The set of breakpoint tests may include a background audio test configured to group one or more adjacent shots in the video based on background audio shared by the one or more adjacent shots, and to return a score indicating that the shot boundary corresponds to the breakpoint based on the grouping.

The set of breakpoint tests may include an on-screen text test configured to detect a threshold difference in displayed text between adjacent shots corresponding to the shot boundary, and to return a score indicating that the shot boundary corresponds to the breakpoint based on the detecting. The set of breakpoint tests may include a facial scan test configured to detect a threshold difference in faces recognized between adjacent shots corresponding to the shot boundary (e.g., facial recognition indicating different people, as opposed to different views of the same people), and to return a score indicating that the shot boundary corresponds to the breakpoint based on the detecting.

The set of breakpoint tests may include a machine learning-based test configured to provide one or more shots corresponding to the shot boundary as input to a machine learning model. The machine learning model is configured to output a score indicating that the shot boundary corresponds to the breakpoint based on the input of the one or more shots.

Figure 11:
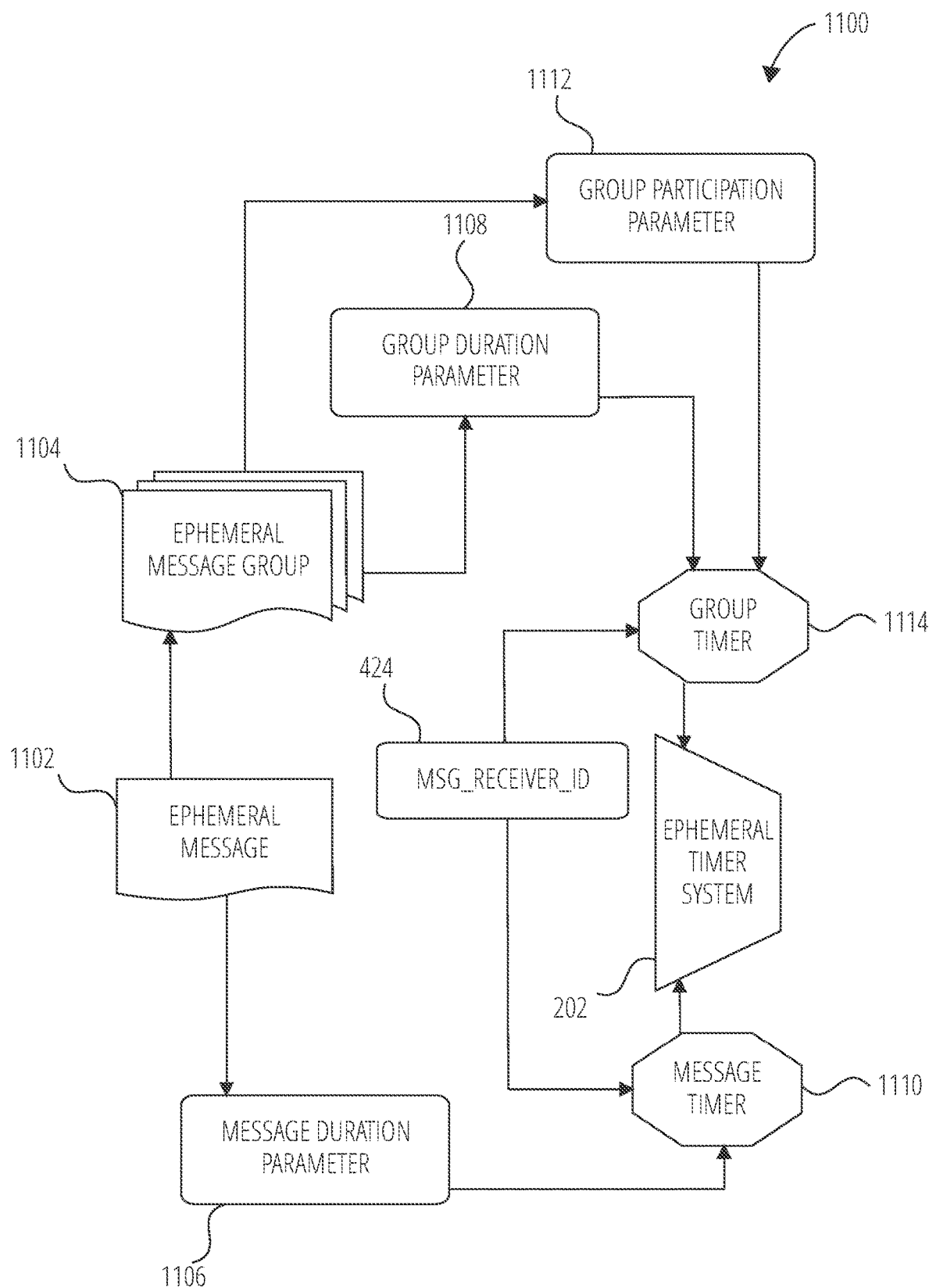
FIG. 11 is a flowchart for an access-limiting process, in accordance with some examples.

FIG. 11 is a schematic diagram illustrating an access-limiting process 1100, in terms of which access to content (e.g., an ephemeral message 1102, and associated multimedia payload of data) or a content collection (e.g., an ephemeral message group 1104) may be time-limited (e.g., made ephemeral).

An ephemeral message 1102 is shown to be associated with a message duration parameter 1106, the value of which determines an amount of time that the ephemeral message 1102 will be displayed to a receiving user of the ephemeral message 1102 by the messaging client 104. In one example, an ephemeral message 1102 is viewable by a receiving user for up to a maximum of 10 seconds, depending on the amount of time that the sending user specifies using the message duration parameter 1106.

The message duration parameter 1106 and the message receiver identifier 424 are shown to be inputs to a message timer 1110, which is responsible for determining the amount of time that the ephemeral message 1102 is shown to a particular receiving user identified by the message receiver identifier 424. In particular, the ephemeral message 1102 will only be shown to the relevant receiving user for a time period determined by the value of the message duration parameter 1106. The message timer 1110 is shown to provide output to a more generalized ephemeral timer system 202, which is responsible for the overall timing of display of content (e.g., an ephemeral message 1102) to a receiving user.

The ephemeral message 1102 is shown in FIG. 11 to be included within an ephemeral message group 1104 (e.g., a collection of messages in a personal story, or an event story). The ephemeral message group 1104 has an associated group duration parameter 1108, a value of which determines a time duration for which the ephemeral message group 1104 is presented and accessible to users of the messaging system 100. The group duration parameter 1108, for example, may be the duration of a music concert, where the ephemeral message group 1104 is a collection of content pertaining to that concert. Alternatively, a user (either the owning user or a curator user) may specify the value for the group duration parameter 1108 when performing the setup and creation of the ephemeral message group 1104.

Additionally, each ephemeral message 1102 within the ephemeral message group 1104 has an associated group participation parameter 1112, a value of which determines the duration of time for which the ephemeral message 1102 will be accessible within the context of the ephemeral message group 1104. Accordingly, a particular ephemeral message group 1104 may "expire" and become inaccessible within the context of the ephemeral message group 1104, prior to the ephemeral message group 1104 itself expiring in terms of the group duration parameter 1108. The group duration parameter 1108, group participation parameter 1112, and message receiver identifier 424 each provide input to a group timer 1114, which operationally determines, firstly, whether a particular ephemeral message 1102 of the ephemeral message group 1104 will be displayed to a particular receiving user and, if so, for how long. Note that the ephemeral message group 1104 is also aware of the identity of the particular receiving user as a result of the message receiver identifier 424.

Accordingly, the group timer 1114 operationally controls the overall lifespan of an associated ephemeral message group 1104, as well as an individual ephemeral message 1102 included in the ephemeral message group 1104. In one example, each and every ephemeral message 1102 within the ephemeral message group 1104 remains viewable and accessible for a time period specified by the group duration parameter 1108. In a further example, a certain ephemeral message 1102 may expire, within the context of ephemeral message group 1104, based on a group participation parameter 1112. Note that a message duration parameter 1106 may still determine the duration of time for which a particular ephemeral message 1102 is displayed to a receiving user, even within the context of the ephemeral message group 1104. Accordingly, the message duration parameter 1106 determines the duration of time that a particular ephemeral message 1102 is displayed to a receiving user, regardless of whether the receiving user is viewing that ephemeral message 1102 inside or outside the context of an ephemeral message group 1104.

The ephemeral timer system 202 may furthermore operationally remove a particular ephemeral message 1102 from the ephemeral message group 1104 based on a determination that it has exceeded an associated group participation parameter 1112. For example, when a sending user has established a group participation parameter 1112 of 24 hours from posting, the ephemeral timer system 202 will remove the relevant ephemeral message 1102 from the ephemeral message group 1104 after the specified 24 hours. The ephemeral timer system 202 also operates to remove an ephemeral message group 1104 when either the group participation parameter 1112 for each and every ephemeral message 1102 within the ephemeral message group 1104 has expired, or when the ephemeral message group 1104 itself has expired in terms of the group duration parameter 1108.

In certain use cases, a creator of a particular ephemeral message group 1104 may specify an indefinite group duration parameter 1108. In this case, the expiration of the group participation parameter 1112 for the last remaining ephemeral message 1102 within the ephemeral message group 1104 will determine when the ephemeral message group 1104 itself expires. In this case, a new ephemeral message 1102, added to the ephemeral message group 1104, with a new group participation parameter 1112, effectively extends the life of an ephemeral message group 1104 to equal the value of the group participation parameter 1112.

Responsive to the ephemeral timer system 202 determining that an ephemeral message group 1104 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1104 to no longer be displayed within a user interface of the messaging client 104. Similarly, when the ephemeral timer system 202 determines that the message duration parameter 1106 for a particular ephemeral message 1102 has expired, the ephemeral timer system 202 causes the messaging client 104 to no longer display an indicium (e.g., an icon or textual identification) associated with the ephemeral message 1102.

Figure 12:
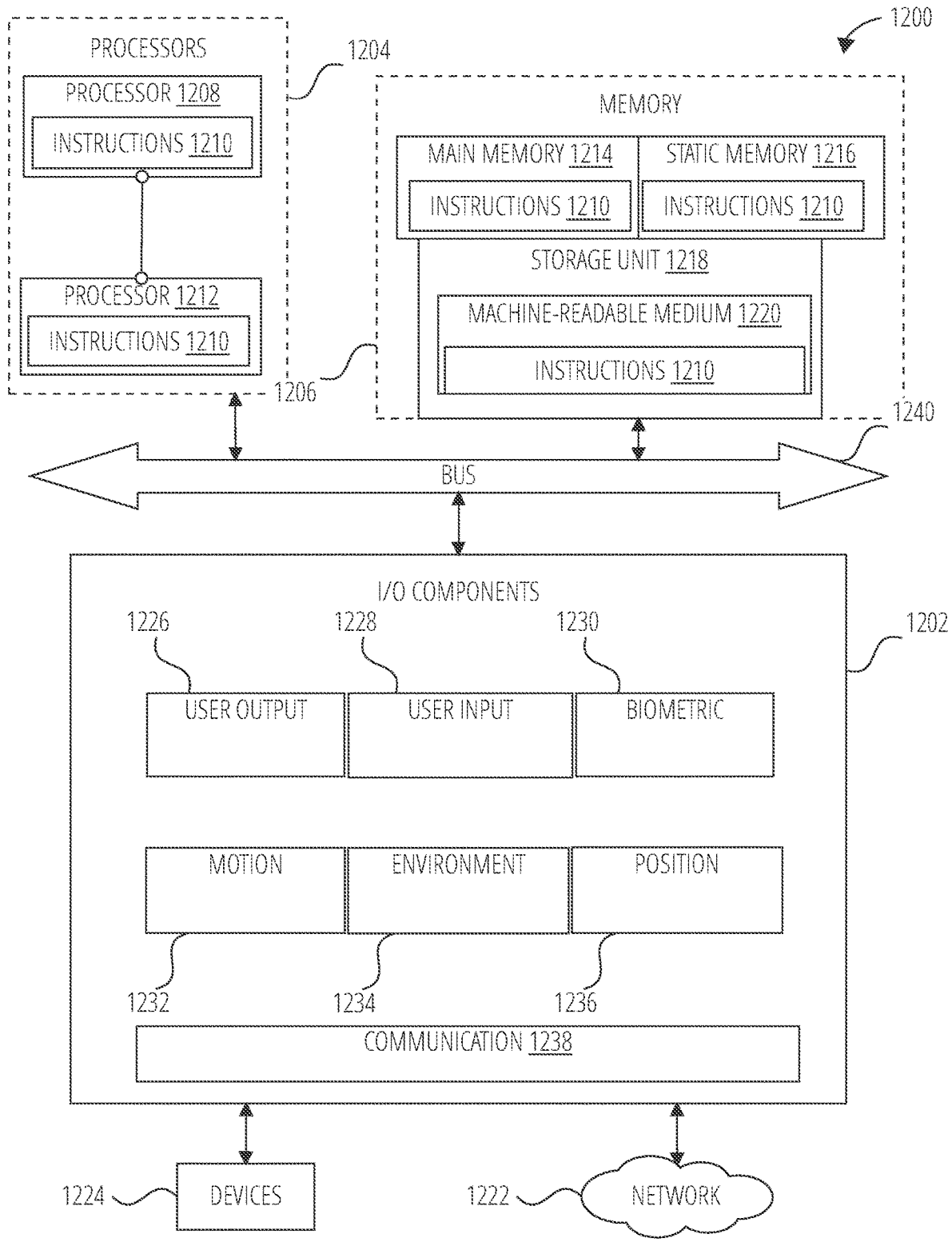
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the Processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface Component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Figure 13:
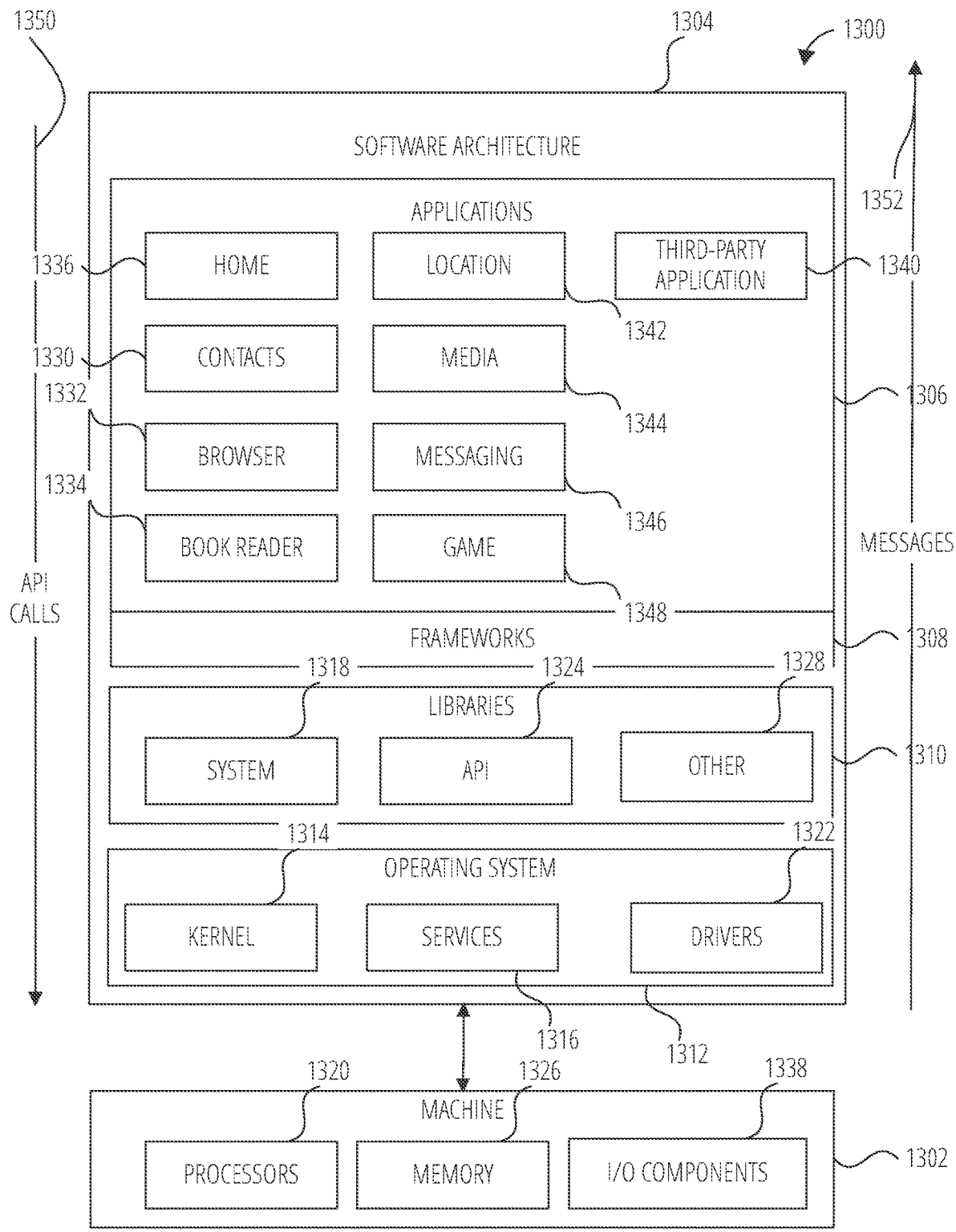
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   determining plural shot boundaries for a video, each shot boundary defining a shot corresponding to a contiguous sequence of video frames that is free of cuts or transitions; and
   for each shot boundary of the plural shot boundaries,
   performing a set of breakpoint tests on the shot boundary, each breakpoint test configured to return a respective score indicating whether the shot boundary corresponds to a breakpoint for potential insertion of an ad during playback of the video,
   calculating a combined score for the shot boundary based on combining the each of the respective scores, and
   setting, in a case where the combined score meets a threshold value, the shot boundary as the breakpoint,
   wherein the set of breakpoint tests includes an audio frequency histogram test configured to:
   determine audio frequency histograms for adjacent shots corresponding to the shot boundary;
   detect, based on the audio frequency histograms, a threshold difference in audio content between the adjacent shots; and
   return the respective score indicating that the shot boundary corresponds to the breakpoint based on the detecting.

2. The method of claim 1, wherein the set of breakpoint tests includes a video fade-out test configured to:
   detect a video fade-out between adjacent shots corresponding to the shot boundary; and
   return a score indicating that the shot boundary corresponds to the breakpoint based on the detecting.

3. The method of claim 1, wherein the set of breakpoint tests includes an audio fade-out test configured to:
   detect an audio fade-out between adjacent shots corresponding to the shot boundary; and
   return a score indicating that the shot boundary corresponds to the breakpoint based on the detecting.

4. The method of claim 1, wherein the set of breakpoint tests includes a transcript gap test configured to:
   detect a pause in speech between adjacent shots corresponding to the shot boundary, based on timestamps of a transcript for the adjacent shots; and
   return a score indicating that the shot boundary corresponds to the breakpoint based on the detecting.

5. The method of claim 1, wherein the set of breakpoint tests includes a color histogram test configured to:
   detect a threshold difference in color content between adjacent shots corresponding to the shot boundary, based on respective color histograms for the adjacent shots; and
   return a score indicating that the shot boundary corresponds to the breakpoint based on the detecting.

6. The method of claim 1, wherein the set of breakpoint tests includes a background audio test configured to:
   group one or more adjacent shots in the video based on background audio shared by the one or more adjacent shots, and
   return a score indicating that the shot boundary corresponds to the breakpoint based on the grouping.

7. The method of claim 6, wherein the background audio is generated by extracting spoken audio from source audio, inverting a resulting waveform of the extracted spoken audio, and combining the inverted resulting waveform with the source audio, or
   wherein the background audio is generated by removing audio mixed to a center audio channel from source audio.

8. The method of claim 1, wherein the set of breakpoint tests includes an on-screen text test configured to:
   detect a threshold difference in displayed text between adjacent shots corresponding to the shot boundary; and return a score indicating that the shot boundary corresponds to the breakpoint based on the detecting.

9. The method of claim 1, wherein the set of breakpoint tests includes a facial scan test configured to:
  detect a threshold difference in faces recognized between adjacent shots corresponding to the shot boundary; and
  return a score indicating that the shot boundary corresponds to the breakpoint based on the detecting.

10. The method of claim 1, wherein the set of breakpoint tests includes a machine learning-based test configured to:
  provide one or more shots corresponding to the shot boundary as input to a machine learning model, the machine learning model being configured to output a score indicating that the shot boundary corresponds to the breakpoint based on the input of the one or more shots.

11. The method of claim 1, wherein determining the shot boundaries is based on frame-pairwise pHash thresholding which is adjustable by a system administrator for limiting at least one of false positives or false negatives.

12. A device comprising:
a processor; and
a memory storing instructions that, when executed by the processor, cause the processor to:
  determine plural shot boundaries for a video, each shot boundary defining a shot corresponding to a contiguous sequence of video frames that is free of cuts or transitions; and
  for each shot boundary of the plural shot boundaries,
  perform a set of breakpoint tests on the shot boundary, each breakpoint test configured to return a respective score indicating whether the shot boundary corresponds to a breakpoint for potential insertion of an ad during playback of the video,
  calculate a combined score for the shot boundary based on combining the each of the respective scores, and
  set, in a case where the combined score meets a threshold value, the shot boundary as the breakpoint,
  wherein the set of breakpoint tests includes an audio frequency histogram test configured to:
  determine audio frequency histograms for adjacent shots corresponding to the shot boundary;
  detect, based on the audio frequency histograms, a threshold difference in audio content between the adjacent shots; and
  return the respective score indicating that the shot boundary corresponds to the breakpoint based on the detecting.

13. The device of claim 12, wherein the set of breakpoint tests includes a video fade-out test configured to:
  detect a video fade-out between adjacent shots corresponding to the shot boundary; and
  return a score indicating that the shot boundary corresponds to the breakpoint based on the detecting.

14. The device of claim 12, wherein the set of breakpoint tests includes an audio fade-out test configured to:
  detect an audio fade-out between adjacent shots corresponding to the shot boundary; and
  return a score indicating that the shot boundary corresponds to the breakpoint based on the detecting.

15. The device of claim 12, wherein the set of breakpoint tests includes a transcript gap test configured to:
  detect a pause in speech between adjacent shots corresponding to the shot boundary, based on timestamps of a transcript for the adjacent shots; and
  return a score indicating that the shot boundary corresponds to the breakpoint based on the detecting.

16. The device of claim 12, wherein the set of breakpoint tests includes a color histogram test configured to:
  detect a threshold difference in color content between adjacent shots corresponding to the shot boundary, based on respective color histograms for the adjacent shots; and
  return a score indicating that the shot boundary corresponds to the breakpoint based on the detecting.

17. The device of claim 12, wherein the set of breakpoint tests includes a background audio test configured to:
  group one or more adjacent shots in the video based on background audio shared by the one or more adjacent shots, and
  return a score indicating that the shot boundary corresponds to the breakpoint based on the grouping.

18. The device of claim 17, wherein the background audio is generated by extracting spoken audio from source audio, inverting a resulting waveform of the extracted spoken audio, and combining the inverted resulting waveform with the source audio, or
  wherein the background audio is generated by removing audio mixed to a center audio channel from source audio.

19. The device of claim 12, wherein the set of breakpoint tests includes an on-screen text test configured to:
  detect a threshold difference in displayed text between adjacent shots corresponding to the shot boundary; and
  return a score indicating that the shot boundary corresponds to the breakpoint based on the detecting.

20. A non-transitory computer-readable storage medium, the computer-readable storage medium including instructions that when executed by a computer, cause the computer to:
  determine plural shot boundaries for a video, each shot boundary defining a shot corresponding to a contiguous sequence of video frames that is free of cuts or transitions;
  for each shot boundary of the plural shot boundaries,
  perform a set of breakpoint tests on the shot boundary, each breakpoint test configured to return a respective score indicating whether the shot boundary corresponds to a breakpoint for potential insertion of an ad during playback of the video,
  calculate a combined score for the shot boundary based on combining the each of the respective scores, and
  set, in a case where the combined score meets a threshold value, the shot boundary as the breakpoint,
  wherein the set of breakpoint tests includes an audio frequency histogram test configured to:
  determine audio frequency histograms for adjacent shots corresponding to the shot boundary;
  detect, based on the audio frequency histograms, a threshold difference in audio content between the adjacent shots; and
  return the respective score indicating that the shot boundary corresponds to the breakpoint based on the detecting.

* * * * *